(12) United States Patent
Bermudez et al.

(10) Patent No.: US 10,375,901 B2
(45) Date of Patent: Aug. 13, 2019

(54) BLOWER/VACUUM

(71) Applicant: MTD Products Inc, Valley City, OH (US)

(72) Inventors: Robert Bermudez, Gilbert, AZ (US); John Payne, Mesa, AZ (US)

(73) Assignee: MTD PRODUCTS INC, Valley City, OH (US)

( * ) Notice: Subject to any disclaimer, the term of this patent is extended or adjusted under 35 U.S.C. 154(b) by 592 days.

(21) Appl. No.: 14/962,687

(22) Filed: Dec. 8, 2015

(65) Prior Publication Data
US 2016/0157686 A1   Jun. 9, 2016

Related U.S. Application Data

(60) Provisional application No. 62/089,572, filed on Dec. 9, 2014.

(51) Int. Cl.
  *A01G 20/43* (2018.01)
  *A01G 20/47* (2018.01)

(52) U.S. Cl.
  CPC ............. *A01G 20/43* (2018.02); *A01G 20/47* (2018.02)

(58) Field of Classification Search
  CPC .............................. A01G 20/43; A01G 20/47
  USPC ........................................................ 15/422.2
  See application file for complete search history.

(56) References Cited

U.S. PATENT DOCUMENTS

| | | |
|---|---|---|
| 3,932,778 A | 1/1976 | Watanabe et al. |
| 3,939,251 A | 2/1976 | Tsuji |
| 3,980,561 A | 9/1976 | Miyagi et al. |
| 3,986,807 A | 10/1976 | Takegami et al. |
| 3,989,089 A | 11/1976 | Deguchi |
| 3,989,983 A | 11/1976 | Uchino et al. |
| 3,993,476 A | 11/1976 | Koike |
| 3,997,806 A | 12/1976 | Noto et al. |
| 4,024,725 A | 5/1977 | Uchida et al. |
| 4,034,453 A | 7/1977 | Tomita et al. |
| 4,037,651 A | 7/1977 | Ito et al. |
| 4,038,060 A | 7/1977 | Kamiya et al. |
| 4,039,871 A | 8/1977 | Yamashita et al. |
| 4,044,570 A | 8/1977 | Ono et al. |
| 4,058,755 A | 11/1977 | Honbu et al. |
| 4,068,241 A | 1/1978 | Yamada |
| 4,076,460 A | 2/1978 | Roof |

(Continued)

FOREIGN PATENT DOCUMENTS

| | | |
|---|---|---|
| EP | 0 198 654 | 10/1986 |
| EP | 0 792 578 | 9/1997 |

(Continued)

OTHER PUBLICATIONS

Metropolitan Vacuum, Datavac.

*Primary Examiner* — David Redding
(74) *Attorney, Agent, or Firm* — Wegman, Hessler

(57) ABSTRACT

A blower/vacuum being interchangeable between a blower configuration and a vacuum configuration is provided. The blower/vacuum includes a blower assembly attachable to a base in the blower configuration and a vacuum assembly attachable to the base in the vacuum configuration. The blower/vacuum includes a fan member that has both a first fan and a second fan integrally formed together, wherein the first fan is utilized to generate air flow in the blower configuration and the second fan is utilized to generate air flow in the vacuum configuration.

16 Claims, 12 Drawing Sheets

(56) References Cited

U.S. PATENT DOCUMENTS

| | | |
|---|---|---|
| 4,077,255 A | 3/1978 | Murakami |
| 4,085,194 A | 4/1978 | Otani et al. |
| 4,090,813 A | 5/1978 | Minato et al. |
| 4,092,133 A | 5/1978 | Kamiya et al. |
| 4,100,463 A | 7/1978 | Sugie |
| 4,109,129 A | 8/1978 | Satoh et al. |
| 4,111,000 A | 9/1978 | Sakazume et al. |
| 4,123,851 A | 11/1978 | Itoh et al. |
| 4,126,015 A | 11/1978 | Fujie et al. |
| 4,127,887 A | 11/1978 | Tanaka et al. |
| 4,130,997 A | 12/1978 | Hara et al. |
| 4,145,179 A | 3/1979 | Tanaka et al. |
| 4,147,587 A | 4/1979 | Utamura et al. |
| 4,152,094 A | 5/1979 | Honda et al. |
| 4,152,218 A | 5/1979 | Narita et al. |
| 4,160,805 A | 7/1979 | Inaba et al. |
| 4,174,677 A | 11/1979 | Nagano et al. |
| 4,175,919 A | 11/1979 | Matsumoto et al. |
| 4,192,641 A | 3/1980 | Nakagawa et al. |
| 4,230,932 A | 10/1980 | Mikamo et al. |
| 4,231,706 A | 11/1980 | Ueda et al. |
| 4,233,183 A | 11/1980 | Inaba et al. |
| 4,239,478 A | 12/1980 | Tanaka et al. |
| 4,247,246 A | 1/1981 | Abe et al. |
| 4,263,654 A | 4/1981 | Fukuzaki et al. |
| 4,268,482 A | 5/1981 | Arashi et al. |
| 4,274,036 A | 6/1981 | Fukasaku et al. |
| 4,287,487 A | 9/1981 | Kuwabara et al. |
| 4,290,908 A | 9/1981 | Horiuchi et al. |
| 4,293,447 A | 10/1981 | Inaba et al. |
| 4,295,792 A | 10/1981 | Tachibana et al. |
| 4,297,319 A | 10/1981 | Ishibashi et al. |
| 4,299,721 A | 11/1981 | Hirano et al. |
| 4,306,165 A | 12/1981 | Kitabayashi et al. |
| 4,311,451 A | 1/1982 | Matumoto et al. |
| 4,314,828 A | 2/1982 | Saito et al. |
| 4,318,777 A | 3/1982 | Sujumura et al. |
| 4,320,797 A | 3/1982 | Kagohata |
| 4,331,939 A | 5/1982 | Kuwabara et al. |
| 4,351,052 A | 9/1982 | Sasaki et al. |
| 4,357,565 A | 11/1982 | Saito et al. |
| 4,361,505 A | 11/1982 | Kikuchi et al. |
| 4,364,168 A | 12/1982 | Matsuyama et al. |
| 4,364,428 A | 12/1982 | Ohtsu et al. |
| 4,365,426 A | 12/1982 | Suzuki et al. |
| 4,368,621 A | 1/1983 | Yamaguma et al. |
| 4,369,350 A | 1/1983 | Kobayashi et al. |
| 4,373,379 A | 2/1983 | Obara et al. |
| 4,387,562 A | 6/1983 | Takao et al. |
| 4,389,184 A | 6/1983 | Tanaka et al. |
| 4,389,607 A | 6/1983 | Sekiyama et al. |
| 4,396,372 A | 8/1983 | Matumoto et al. |
| 4,406,617 A | 9/1983 | Hirozawa |
| 4,409,452 A | 10/1983 | Oouchi et al. |
| 4,411,140 A | 10/1983 | Katsumata et al. |
| 4,412,261 A | 10/1983 | Tateyama et al. |
| 4,412,781 A | 11/1983 | Abe et al. |
| 4,416,847 A | 11/1983 | Saito et al. |
| 4,421,732 A | 12/1983 | Komuro et al. |
| 4,425,765 A | 1/1984 | Fukushima et al. |
| 4,427,642 A | 1/1984 | Arashi et al. |
| 4,429,541 A | 2/1984 | Kamejima et al. |
| 4,432,694 A | 2/1984 | Kuroda et al. |
| 4,435,151 A | 3/1984 | Matumoto et al. |
| 4,437,321 A | 3/1984 | Asai |
| 4,437,992 A | 3/1984 | Saito et al. |
| 4,441,435 A | 4/1984 | Miyamoto |
| 4,445,841 A | 5/1984 | Tanaka et al. |
| 4,446,594 A | 5/1984 | Watanabe et al. |
| 4,448,040 A | 5/1984 | Kunugi |
| 4,448,236 A | 5/1984 | Kimura |
| 4,452,733 A | 6/1984 | Horiuchi et al. |
| 4,454,728 A | 6/1984 | Hanada et al. |
| 4,455,656 A | 6/1984 | Tanaka et al. |
| 4,456,166 A | 6/1984 | Kagohata |
| 4,466,480 A | 8/1984 | Ito et al. |
| 4,469,168 A | 9/1984 | Itoh et al. |
| 4,475,807 A | 10/1984 | Toyoda et al. |
| 4,482,351 A | 11/1984 | Kitazawa et al. |
| 4,482,479 A | 11/1984 | Kamiya et al. |
| 4,483,656 A | 11/1984 | Abe et al. |
| 4,492,546 A | 1/1985 | Kasuya et al. |
| 4,493,611 A | 1/1985 | Funakoshi et al. |
| 4,493,878 A | 1/1985 | Horiba et al. |
| 4,495,142 A | 1/1985 | Nakayama et al. |
| 4,500,035 A | 2/1985 | Kuroda et al. |
| 4,500,998 A | 2/1985 | Kuwabara et al. |
| 4,502,286 A | 3/1985 | Okada et al. |
| 4,502,928 A | 3/1985 | Umetani et al. |
| 4,503,907 A | 3/1985 | Tanaka et al. |
| 4,506,506 A | 3/1985 | Usui et al. |
| 4,507,942 A | 4/1985 | Hirose et al. |
| 4,509,354 A | 4/1985 | Suzuki et al. |
| 4,513,808 A | 4/1985 | Ito et al. |
| 4,517,282 A | 5/1985 | Tomisawa et al. |
| 4,517,804 A | 5/1985 | Ura et al. |
| 4,518,032 A | 5/1985 | Funasaki et al. |
| 4,519,690 A | 5/1985 | Tomisawa et al. |
| 4,522,337 A | 6/1985 | Toudo et al. |
| 4,526,712 A | 7/1985 | Hirano et al. |
| 4,527,125 A | 7/1985 | Miyanaka et al. |
| 4,535,234 A | 8/1985 | Fujimara et al. |
| 4,541,097 A | 9/1985 | Kuwabara et al. |
| 4,551,996 A | 11/1985 | Hirose et al. |
| 4,554,223 A | 11/1985 | Yokoyama et al. |
| 4,557,114 A | 12/1985 | Kato et al. |
| 4,558,227 A | 12/1985 | Yanada et al. |
| 4,558,571 A | 12/1985 | Yoshinaga et al. |
| 4,559,295 A | 12/1985 | Tomisawa et al. |
| 4,563,126 A | 1/1986 | Kobayashi et al. |
| 4,564,444 A | 1/1986 | Hiraoka et al. |
| 4,577,270 A | 3/1986 | Sugano et al. |
| 4,589,827 A | 5/1986 | Mizoguchi et al. |
| 4,590,599 A | 5/1986 | Kawakubo et al. |
| 4,593,986 A | 6/1986 | Tomisawa et al. |
| 4,602,372 A | 7/1986 | Sasaki et al. |
| 4,603,556 A | 8/1986 | Suefuji et al. |
| 4,605,863 A | 8/1986 | Toudo et al. |
| 4,608,232 A | 8/1986 | Sunano et al. |
| 4,612,261 A | 9/1986 | Tsukui et al. |
| 4,614,152 A | 9/1986 | Fukasaku et al. |
| 4,615,357 A | 10/1986 | Ito |
| 4,615,620 A | 10/1986 | Noguchi et al. |
| 4,622,922 A | 11/1986 | Miyagaki et al. |
| 4,626,720 A | 12/1986 | Fukasaku et al. |
| 4,628,616 A | 12/1986 | Shirai et al. |
| 4,629,587 A | 12/1986 | Monden et al. |
| 4,629,664 A | 12/1986 | Tsukui et al. |
| 4,638,573 A | 1/1987 | Nakamura et al. |
| 4,640,630 A | 2/1987 | Yoshioka et al. |
| 4,643,845 A | 2/1987 | Omote et al. |
| 4,644,606 A | 2/1987 | Luerken et al. |
| 4,647,271 A | 3/1987 | Nagai et al. |
| 4,649,654 A | 3/1987 | Hikino et al. |
| 4,649,709 A | 3/1987 | Kagohata et al. |
| 4,653,288 A | 3/1987 | Sayo et al. |
| 4,653,998 A | 3/1987 | Sohma et al. |
| 4,693,945 A | 9/1987 | Ohyauchi et al. |
| 4,696,689 A | 9/1987 | Mori et al. |
| 4,697,734 A | 10/1987 | Ueda |
| 4,698,981 A | 10/1987 | Kaneko et al. |
| 4,704,139 A | 11/1987 | Yamamoto et al. |
| 4,709,714 A | 12/1987 | Nishino et al. |
| 4,710,318 A | 12/1987 | Horiuchi et al. |
| 4,718,140 A | 1/1988 | Johnson |
| 4,723,480 A | 2/1988 | Yagi et al. |
| 4,731,224 A | 3/1988 | Kawashima |
| 4,733,479 A | 3/1988 | Kaji et al. |
| 4,735,550 A | 4/1988 | Okawada et al. |
| 4,740,980 A | 4/1988 | Shirakura et al. |
| 4,742,692 A | 5/1988 | Reid, Jr. et al. |
| 4,742,762 A | 5/1988 | Ito et al. |
| 4,757,944 A | 7/1988 | Kagohata et al. |
| 4,760,772 A | 8/1988 | Horiguchi et al. |

(56) References Cited

U.S. PATENT DOCUMENTS

| | | |
|---|---|---|
| 4,767,285 A | 8/1988 | Jyoraku et al. |
| 4,769,776 A | 9/1988 | Hiraoka et al. |
| 4,770,000 A | 9/1988 | Kuroda et al. |
| 4,770,615 A | 9/1988 | Fujiwara et al. |
| 4,774,813 A | 10/1988 | Yokoyama |
| 4,778,297 A | 10/1988 | Watahiki et al. |
| 4,784,043 A | 11/1988 | Kobayashi et al. |
| 4,791,981 A | 12/1988 | Ito |
| 4,797,068 A | 1/1989 | Hayakawa et al. |
| 4,809,058 A | 2/1989 | Funamoto et al. |
| 4,809,394 A | 3/1989 | Suka et al. |
| 4,820,594 A | 4/1989 | Sugita et al. |
| 4,821,052 A | 4/1989 | Mitsuya et al. |
| 4,825,560 A | 5/1989 | Nakamura et al. |
| 4,829,625 A | 5/1989 | Wang |
| 4,829,884 A | 5/1989 | Kagohata |
| 4,834,550 A | 5/1989 | Yano et al. |
| 4,836,991 A | 6/1989 | Ishiguro et al. |
| 4,837,663 A | 6/1989 | Zushi et al. |
| 4,852,133 A | 7/1989 | Ikeda et al. |
| 4,852,798 A | 8/1989 | Ito et al. |
| 4,865,119 A | 9/1989 | Okada et al. |
| 4,870,833 A | 10/1989 | Matsuda et al. |
| 4,877,081 A | 10/1989 | Ohtsu |
| 4,877,344 A | 10/1989 | Watahiki et al. |
| 4,880,474 A | 11/1989 | Koharagi et al. |
| 4,881,026 A | 11/1989 | Ishida et al. |
| 4,885,999 A | 12/1989 | Baba et al. |
| 4,893,376 A | 1/1990 | Sunagawa et al. |
| 4,897,762 A | 1/1990 | Daikoku et al. |
| 4,899,930 A | 2/1990 | Kagohata et al. |
| 4,904,388 A | 2/1990 | Baba et al. |
| 4,905,341 A | 3/1990 | Sunagawa et al. |
| 4,912,593 A | 3/1990 | Iwao et al. |
| 4,918,561 A | 4/1990 | Watanabe et al. |
| 4,938,661 A | 7/1990 | Kobayashi et al. |
| 4,941,525 A | 7/1990 | Ito et al. |
| 4,943,863 A | 7/1990 | Ainoya |
| 4,950,462 A | 8/1990 | Nakao et al. |
| 4,954,465 A | 9/1990 | Kawashima et al. |
| 4,955,105 A | 9/1990 | Sunagawa et al. |
| 4,955,208 A | 9/1990 | Kawashima et al. |
| 4,958,406 A | 9/1990 | Toyoshima et al. |
| 4,959,693 A | 9/1990 | Mitsuya et al. |
| 4,960,512 A | 10/1990 | Baba et al. |
| RE33,424 E | 11/1990 | Noguchi et al. |
| 4,969,798 A | 11/1990 | Sakai et al. |
| 4,983,895 A | 1/1991 | Koharagi et al. |
| 4,991,180 A | 2/1991 | Yamaguchi et al. |
| 4,991,520 A | 2/1991 | Tsumura et al. |
| 4,998,034 A | 3/1991 | Hashimoto et al. |
| 4,998,143 A | 3/1991 | Kumasaka et al. |
| 5,003,663 A | 4/1991 | Sunagawa et al. |
| 5,008,691 A | 4/1991 | Kumasaka et al. |
| 5,008,716 A | 4/1991 | Onose et al. |
| 5,011,388 A | 4/1991 | Aoki et al. |
| 5,021,739 A | 6/1991 | Yokosawa et al. |
| 5,031,059 A | 7/1991 | Yamaguchi et al. |
| 5,035,586 A | 7/1991 | Sadler et al. |
| 5,038,496 A | 8/1991 | Mishina et al. |
| 5,043,305 A | 8/1991 | Tanaka et al. |
| 5,044,941 A | 9/1991 | Noya |
| 5,051,238 A | 9/1991 | Umetsu et al. |
| 5,052,472 A | 10/1991 | Takahashi et al. |
| 5,054,156 A | 10/1991 | Watanabe et al. |
| 5,063,832 A | 11/1991 | Mirumachi et al. |
| 5,067,419 A | 11/1991 | Kobayashi et al. |
| 5,074,131 A | 12/1991 | Hirose et al. |
| 5,075,607 A | 12/1991 | Koharagi et al. |
| 5,077,601 A | 12/1991 | Hatada et al. |
| 5,078,971 A | 1/1992 | Matuda et al. |
| 5,087,853 A | 2/1992 | Oguro et al. |
| 5,090,220 A | 2/1992 | Fukuzawa et al. |
| 5,090,676 A | 2/1992 | Matsuno et al. |
| 5,091,856 A | 2/1992 | Hasegawa et al. |
| 5,094,586 A | 3/1992 | Takada et al. |
| 5,098,265 A | 3/1992 | Machida et al. |
| 5,101,534 A | 4/1992 | Watanabe et al. |
| 5,106,073 A | 4/1992 | Kawauchi et al. |
| 5,110,266 A | 5/1992 | Toyoshima et al. |
| 5,114,667 A | 5/1992 | Hayashi et al. |
| D327,316 S | 6/1992 | Yoshidomi et al. |
| 5,118,038 A | 6/1992 | Shimizu et al. |
| 5,131,114 A | 7/1992 | Sunagawa et al. |
| 5,137,490 A | 8/1992 | Ishikawa et al. |
| 5,144,716 A | 9/1992 | Watanabe et al. |
| 5,151,256 A | 9/1992 | Kato et al. |
| 5,152,513 A | 10/1992 | Ogasawara et al. |
| 5,155,083 A | 10/1992 | Yoshida et al. |
| 5,155,885 A | 10/1992 | Jyouraku et al. |
| 5,158,582 A | 10/1992 | Onitsuka et al. |
| 5,159,738 A | 11/1992 | Sunagawa et al. |
| 5,163,599 A | 11/1992 | Mishina et al. |
| 5,166,585 A | 11/1992 | Kobaragi et al. |
| 5,179,412 A | 1/1993 | Yamada et al. |
| 5,194,043 A | 3/1993 | Takahashi et al. |
| 5,199,485 A | 4/1993 | Ito et al. |
| 5,203,487 A | 4/1993 | Mishina et al. |
| 5,212,022 A | 5/1993 | Takahashi et al. |
| RE34,286 E | 6/1993 | Toyoshima et al. |
| 5,216,778 A | 6/1993 | Suzuki et al. |
| 5,223,052 A | 6/1993 | Yamamoto et al. |
| 5,231,937 A | 8/1993 | Kobayashi et al. |
| 5,233,946 A | 8/1993 | Yamami |
| 5,240,237 A | 8/1993 | Nakura et al. |
| 5,243,732 A | 9/1993 | Koharagi et al. |
| 5,258,649 A | 11/1993 | Tanaka et al. |
| 5,263,894 A | 11/1993 | Hirakawa et al. |
| 5,266,004 A | 11/1993 | Tsumurai et al. |
| 5,267,371 A | 12/1993 | Soler et al. |
| 5,269,665 A | 12/1993 | Sadler et al. |
| 5,270,578 A | 12/1993 | Yamamura |
| 5,271,615 A | 12/1993 | Kawauchi et al. |
| 5,275,010 A | 1/1994 | Hisajima et al. |
| 5,279,045 A | 1/1994 | Odashima et al. |
| 5,281,083 A | 1/1994 | Ito et al. |
| 5,282,369 A | 2/1994 | Ohuchi et al. |
| 5,288,455 A | 2/1994 | Siga et al. |
| 5,289,868 A | 3/1994 | Koseki et al. |
| 5,294,872 A | 3/1994 | Koharagi et al. |
| 5,301,881 A | 4/1994 | Hayashi et al. |
| 5,311,421 A | 5/1994 | Nomura et al. |
| 5,314,321 A | 5/1994 | Yamamoto et al. |
| 5,317,467 A | 5/1994 | Kato et al. |
| 5,320,050 A | 6/1994 | Ishida et al. |
| 5,333,666 A | 8/1994 | Ootomo et al. |
| 5,336,046 A | 8/1994 | Hashimoto et al. |
| 5,345,785 A | 9/1994 | Sekigami et al. |
| 5,351,114 A | 9/1994 | Matsuno |
| 5,353,604 A | 10/1994 | Oguni et al. |
| 5,358,166 A | 10/1994 | Mishina et al. |
| 5,363,668 A | 11/1994 | Nakao et al. |
| 5,365,633 A | 11/1994 | Sunagawa et al. |
| 5,368,727 A | 11/1994 | Takahashi et al. |
| 5,381,043 A | 1/1995 | Kohiyama et al. |
| 5,381,584 A | 1/1995 | Jyoraku et al. |
| 5,395,210 A | 3/1995 | Yamazaki et al. |
| 5,400,466 A | 3/1995 | Alderman et al. |
| 5,414,591 A | 5/1995 | Kimura et al. |
| 5,429,808 A | 7/1995 | Kuroda et al. |
| 5,431,347 A | 7/1995 | Hayashi et al. |
| 5,432,662 A | 7/1995 | Kato et al. |
| 5,437,742 A | 8/1995 | Siga et al. |
| 5,447,042 A | 9/1995 | Ohuchi et al. |
| 5,463,299 A | 10/1995 | Futami et al. |
| 5,467,912 A | 11/1995 | Mishina et al. |
| 5,487,639 A | 1/1996 | Asabuki et al. |
| 5,504,651 A | 4/1996 | Atarashi et al. |
| 5,516,263 A | 5/1996 | Nishida et al. |
| 5,517,830 A | 5/1996 | Ohuchi et al. |
| 5,530,304 A | 6/1996 | Mirumachi et al. |
| 5,530,885 A | 6/1996 | Kahohata |
| 5,533,869 A | 7/1996 | Garrison et al. |
| 5,536,128 A | 7/1996 | Shimoyashiro et al. |

(56) References Cited

U.S. PATENT DOCUMENTS

| | | |
|---|---|---|
| 5,536,139 A | 7/1996 | Yamazaki et al. |
| 5,548,174 A | 8/1996 | Siga et al. |
| 5,548,375 A | 8/1996 | Mitsuya et al. |
| 5,556,269 A | 9/1996 | Suzuki et al. |
| 5,557,386 A | 9/1996 | Merguro et al. |
| 5,558,493 A | 9/1996 | Hayashi et al. |
| 5,561,363 A | 10/1996 | Mashino et al. |
| 5,569,023 A | 10/1996 | Ishida et al. |
| 5,571,284 A | 11/1996 | Kawamichi et al. |
| 5,583,492 A | 12/1996 | Nakanishi et al. |
| 5,584,969 A | 12/1996 | Nagai et al. |
| 5,587,320 A | 12/1996 | Shindo et al. |
| 5,588,178 A | 12/1996 | Lin |
| 5,600,886 A | 2/1997 | Asabuki et al. |
| 5,628,615 A | 5/1997 | Asabuki et al. |
| 5,630,667 A | 5/1997 | Ito |
| 5,631,821 A | 5/1997 | Muso |
| 5,635,142 A | 6/1997 | Ichiki et al. |
| 5,641,128 A | 6/1997 | Kimura et al. |
| 5,651,263 A | 7/1997 | Nonaka et al. |
| 5,651,414 A | 7/1997 | Suzuki et al. |
| 5,666,598 A | 9/1997 | Sugita et al. |
| 5,672,052 A | 9/1997 | Ishida et al. |
| 5,675,970 A | 10/1997 | Yamada et al. |
| 5,685,163 A | 11/1997 | Fujita et al. |
| 5,685,242 A | 11/1997 | Narato et al. |
| 5,686,053 A | 11/1997 | Kikkawa et al. |
| 5,689,572 A | 11/1997 | Ohki et al. |
| 5,697,152 A | 12/1997 | Yamazaki et al. |
| 5,701,560 A | 12/1997 | Tsujita et al. |
| 5,705,854 A | 1/1998 | Atarashi et al. |
| 5,709,531 A | 1/1998 | Nishida et al. |
| 5,710,042 A | 1/1998 | Shindo et al. |
| 5,716,200 A | 2/1998 | Mirumachi et al. |
| 5,740,918 A | 4/1998 | Hayashi et al. |
| 5,752,785 A | 5/1998 | Tanaka et al. |
| 5,753,925 A | 5/1998 | Yamanaka et al. |
| 5,755,082 A | 5/1998 | Takahashi et al. |
| 5,764,535 A | 6/1998 | Okazaki et al. |
| 5,768,902 A | 6/1998 | Nonaka et al. |
| 5,769,333 A | 6/1998 | Kimura et al. |
| 5,774,633 A | 6/1998 | Baba et al. |
| 5,776,866 A | 7/1998 | Karaki et al. |
| 5,788,944 A | 8/1998 | Kikkawa et al. |
| 5,793,611 A | 8/1998 | Takazato et al. |
| 5,802,444 A | 9/1998 | Takeuchi et al. |
| 5,803,566 A | 9/1998 | Ogino |
| 5,805,953 A | 9/1998 | Kikuchi et al. |
| 5,806,337 A | 9/1998 | Mabuchi et al. |
| 5,818,694 A | 10/1998 | Daikoku et al. |
| 5,842,980 A | 12/1998 | Tsuda |
| 5,845,052 A | 12/1998 | Baba et al. |
| 5,894,630 A | 4/1999 | Bitner et al. |
| 5,934,368 A | 8/1999 | Tanaka et al. |
| 5,943,662 A | 8/1999 | Baba et al. |
| 5,945,081 A | 8/1999 | Kikkawa et al. |
| 5,964,103 A | 10/1999 | Mabuchi et al. |
| 5,976,378 A | 11/1999 | Sumino et al. |
| 5,977,427 A | 11/1999 | Tamata et al. |
| 5,990,570 A | 11/1999 | Yoshida et al. |
| 5,992,154 A | 11/1999 | Kawada et al. |
| 6,004,377 A | 12/1999 | Tamata et al. |
| 6,019,808 A | 2/2000 | Ishikawa et al. |
| 6,027,852 A | 2/2000 | Sasaki et al. |
| 6,039,866 A | 3/2000 | Tanaka et al. |
| 6,080,370 A | 6/2000 | Kikkawa et al. |
| 6,082,341 A | 7/2000 | Arai et al. |
| 6,087,072 A | 7/2000 | Sasaki et al. |
| 6,098,421 A | 8/2000 | Fujita et al. |
| 6,104,451 A | 8/2000 | Matsuoka et al. |
| 6,105,206 A * | 8/2000 | Tokumaru ............... A47L 5/14 15/344 |
| 6,116,864 A | 9/2000 | Veser et al. |
| 6,141,823 A | 11/2000 | Fujiwara et al. |
| 6,141,824 A | 11/2000 | Fujiwara et al. |
| 6,146,094 A | 11/2000 | Obana et al. |
| 6,157,091 A | 12/2000 | Yoshida et al. |
| 6,162,356 A | 12/2000 | Ikeda et al. |
| 6,163,082 A | 12/2000 | Yoshida et al. |
| 6,169,337 B1 | 1/2001 | Yoshida et al. |
| 6,182,807 B1 | 2/2001 | Saito et al. |
| 6,191,545 B1 | 2/2001 | Kawabata et al. |
| 6,203,275 B1 | 3/2001 | Kobayashi et al. |
| 6,205,010 B1 | 3/2001 | Ohsaka et al. |
| 6,210,132 B1 | 4/2001 | Shiinoki et al. |
| 6,212,732 B1 | 4/2001 | Tajima et al. |
| 6,240,736 B1 | 6/2001 | Fujita et al. |
| 6,251,264 B1 | 6/2001 | Tanaka et al. |
| 6,279,342 B1 | 8/2001 | Mabuchi et al. |
| 6,279,514 B1 | 8/2001 | Browder et al. |
| 6,282,749 B1 | 9/2001 | Tajima et al. |
| 6,290,360 B1 | 9/2001 | Konuma et al. |
| 6,290,458 B1 | 9/2001 | Irie et al. |
| 6,294,845 B1 | 9/2001 | Yoshida et al. |
| 6,295,692 B1 | 10/2001 | Shideler |
| 6,298,796 B1 | 10/2001 | Okazaki et al. |
| 6,302,643 B1 | 10/2001 | Kurokawa et al. |
| 6,305,909 B1 | 10/2001 | Jankowski et al. |
| 6,307,279 B1 | 10/2001 | Yoshida et al. |
| 6,326,189 B1 | 12/2001 | Fukuzono et al. |
| 6,328,530 B1 | 12/2001 | Kato et al. |
| 6,337,548 B2 | 1/2002 | Kawabata et al. |
| 6,345,667 B1 | 2/2002 | Hata et al. |
| 6,368,076 B1 | 4/2002 | Zoland et al. |
| 6,386,196 B1 | 5/2002 | Culton |
| 6,390,059 B1 | 5/2002 | Shiraishi et al. |
| 6,338,304 B2 | 6/2002 | Yamamoto et al. |
| 6,401,891 B1 | 6/2002 | Saito et al. |
| 6,408,998 B1 | 6/2002 | Saito et al. |
| 6,412,681 B2 | 7/2002 | Mukuno et al. |
| 6,420,799 B1 | 7/2002 | Sakamoto et al. |
| 6,427,659 B2 | 8/2002 | Shiraishi et al. |
| 6,435,819 B2 | 8/2002 | Irie et al. |
| 6,438,979 B2 | 8/2002 | Fujita et al. |
| 6,442,790 B1 | 9/2002 | Svoboda et al. |
| 6,442,792 B1 | 9/2002 | Sudou et al. |
| 6,454,177 B1 | 9/2002 | Sasao et al. |
| 6,479,956 B1 | 11/2002 | Kawabata et al. |
| 6,479,973 B2 | 11/2002 | Saito et al. |
| 6,488,475 B2 | 12/2002 | Murata et al. |
| 6,490,985 B2 | 12/2002 | Yamamoto et al. |
| 6,491,832 B2 | 12/2002 | Yoshioka et al. |
| 6,503,065 B2 | 1/2003 | Tanaka et al. |
| 6,520,144 B2 | 2/2003 | Shiraishi et al. |
| 6,527,509 B2 | 3/2003 | Kurokawa et al. |
| 6,528,899 B1 | 3/2003 | Saito et al. |
| 6,534,883 B2 | 3/2003 | Yoshida et al. |
| 6,547,856 B2 | 4/2003 | Cartellone |
| 6,554,059 B2 | 4/2003 | Hata et al. |
| 6,502,520 B1 | 6/2003 | Nishi et al. |
| 6,582,189 B2 | 6/2003 | Irie et al. |
| 6,588,597 B2 | 7/2003 | Arakane et al. |
| 6,591,620 B2 | 7/2003 | Kikuchi et al. |
| 6,601,610 B1 | 8/2003 | Mitomo et al. |
| 6,602,736 B1 | 8/2003 | Matsuoka et al. |
| 6,606,472 B1 | 8/2003 | Mori et al. |
| 6,622,601 B2 | 9/2003 | Hashimoto et al. |
| 6,629,818 B2 | 10/2003 | Svoboda |
| 6,633,035 B1 | 10/2003 | Katagiri et al. |
| 6,637,982 B2 | 10/2003 | Fukushima et al. |
| 6,637,983 B2 | 10/2003 | Fukushima et al. |
| 6,638,036 B1 | 10/2003 | Kobayashi et al. |
| 6,642,681 B2 | 11/2003 | Kawabata et al. |
| 6,691,951 B2 | 2/2004 | Frazier |
| 6,697,253 B2 | 2/2004 | Minamitani et al. |
| 6,705,104 B2 | 3/2004 | Tani et al. |
| 6,705,408 B2 | 3/2004 | Kim et al. |
| 6,715,432 B2 | 4/2004 | Tsumura et al. |
| 6,732,706 B2 | 5/2004 | Shiraishi et al. |
| 6,735,813 B2 | 5/2004 | Oohama |
| 6,741,464 B2 | 5/2004 | Kitano et al. |
| 6,748,751 B2 | 6/2004 | Ohmi et al. |
| 6,761,301 B2 | 7/2004 | Mukuno et al. |
| 6,769,521 B2 | 8/2004 | Saito et al. |

(56) References Cited

U.S. PATENT DOCUMENTS

| | | | |
|---|---|---|---|
| 6,775,595 B1 | 8/2004 | Yabutani et al. |
| 6,780,251 B2 | 8/2004 | Tometsuka |
| 6,783,245 B2 | 8/2004 | Konuma et al. |
| 6,813,901 B2 | 11/2004 | Mabuchi et al. |
| 6,823,659 B2 | 11/2004 | Hiratsuka et al. |
| 6,824,273 B2 | 11/2004 | Konuma et al. |
| 6,837,443 B2 | 1/2005 | Saitoh et al. |
| 6,860,112 B1 | 3/2005 | Kobayashi et al. |
| 6,867,841 B2 | 3/2005 | Nakasu et al. |
| 6,868,680 B2 | 3/2005 | Sakuma et al. |
| 6,874,694 B2 | 4/2005 | Saitoh et al. |
| 6,873,525 B2 | 5/2005 | Minamitani et al. |
| 6,889,619 B2 | 5/2005 | Okazaki et al. |
| 6,890,673 B2 | 5/2005 | Higashiyama et al. |
| 6,900,555 B2 | 5/2005 | Sakamoto et al. |
| 6,900,875 B2 | 5/2005 | Nakano et al. |
| 6,907,891 B2 | 6/2005 | Anazawa et al. |
| 6,938,560 B2 | 9/2005 | Okazaki et al. |
| 6,948,336 B2 | 9/2005 | Fujita et al. |
| 6,948,552 B2 | 9/2005 | Kosugi et al. |
| 6,960,128 B2 | 11/2005 | Honda et al. |
| 6,964,709 B2 | 11/2005 | Matsumoto et al. |
| 6,972,954 B2 | 12/2005 | Minamitani et al. |
| 6,976,440 B2 | 12/2005 | Ohtani et al. |
| 6,987,668 B2 | 1/2006 | Kitano et al. |
| 7,005,053 B2 | 2/2006 | Yamazaki et al. |
| 7,013,863 B2 | 3/2006 | Shiraishi et al. |
| 7,020,306 B2 | 3/2006 | Hirose et al. |
| 7,022,151 B2 | 4/2006 | Ono |
| 7,028,534 B2 | 4/2006 | Watanabe et al. |
| 7,028,819 B2 | 4/2006 | Saito et al. |
| 7,039,454 B1 | 5/2006 | Kaga et al. |
| 7,044,090 B2 | 5/2006 | Ohtsu et al. |
| 7,046,470 B2 | 5/2006 | Yamanashi et al. |
| 7,048,173 B2 | 5/2006 | Nakatsuka et al. |
| 7,048,626 B2 | 5/2006 | Honda et al. |
| 7,052,389 B2 | 5/2006 | Honda et al. |
| 7,076,339 B2 | 7/2006 | Yabutani et al. |
| 7,090,709 B2 | 8/2006 | Ono |
| 7,103,979 B2 | 9/2006 | Yoshida et al. |
| 7,107,669 B2 | 9/2006 | Tanaka et al. |
| 7,121,253 B2 | 10/2006 | Shiraishi et al. |
| 7,128,882 B2 | 10/2006 | Tamata et al. |
| 7,141,221 B2 | 11/2006 | Irie et al. |
| 7,152,978 B2 | 12/2006 | Konuma et al. |
| 7,159,533 B1 | 1/2007 | Redd et al. |
| 7,165,418 B2 | 1/2007 | Mabuchi et al. |
| 7,168,374 B2 | 1/2007 | Okazaki et al. |
| 7,186,794 B2 | 3/2007 | Goto et al. |
| 7,207,083 B2 | 4/2007 | Hayashi et al. |
| 7,213,522 B2 | 5/2007 | Okazaki et al. |
| 7,219,435 B2 | 5/2007 | Yoshida et al. |
| 7,225,171 B2 | 5/2007 | Kikuchi et al. |
| 7,234,646 B2 | 6/2007 | Saitoh et al. |
| 7,242,580 B1 | 7/2007 | Tanaka |
| 7,246,498 B2 | 7/2007 | Fujita et al. |
| 7,247,958 B2 | 7/2007 | Iwashige et al. |
| 7,261,071 B2 | 8/2007 | Ohtsu et al. |
| 7,261,868 B2 | 8/2007 | Kanno et al. |
| 7,276,099 B2 | 10/2007 | Hayashi et al. |
| 7,285,250 B2 | 10/2007 | Kanno et al. |
| 7,293,878 B2 | 11/2007 | Morita et al. |
| 7,294,315 B1 | 11/2007 | Kanno et al. |
| 7,308,409 B2 | 12/2007 | Tamata et al. |
| 7,320,841 B2 | 1/2008 | Yamaga et al. |
| 7,323,026 B2 | 1/2008 | Ono |
| 7,370,623 B1 | 5/2008 | Solinski et al. |
| 7,371,808 B2 | 5/2008 | Goto et al. |
| 7,372,561 B2 | 5/2008 | Shibata et al. |
| 7,392,752 B2 | 7/2008 | Okazaki et al. |
| 7,394,081 B2 | 7/2008 | Okazaki et al. |
| 7,407,579 B2 | 8/2008 | Sumino et al. |
| 7,416,471 B2 | 8/2008 | Shimizu et al. |
| 7,425,267 B2 | 9/2008 | Sumino et al. |
| 7,437,882 B2 | 10/2008 | Matsunaga et al. |
| 7,448,825 B2 | 11/2008 | Kasahara et al. |
| 7,457,112 B2 | 11/2008 | Fukuda et al. |
| 7,465,215 B2 | 12/2008 | Shimizu et al. |
| 7,470,104 B2 | 12/2008 | Ishikawa et al. |
| D584,392 S | 1/2009 | Noda |
| 7,472,847 B2 | 1/2009 | Mukai et al. |
| 7,478,613 B2 | 1/2009 | Gunnarsson et al. |
| 7,488,949 B2 | 2/2009 | Ueno et al. |
| 7,494,941 B2 | 2/2009 | Kasahara et al. |
| 7,504,720 B2 | 3/2009 | Nakatsu et al. |
| 7,511,277 B2 | 3/2009 | Ueno et al. |
| 7,516,553 B2 | 4/2009 | Yoshida et al. |
| 7,521,011 B2 | 4/2009 | Ishikawara et al. |
| D591,916 S | 5/2009 | Kosugi et al. |
| 7,530,305 B2 | 5/2009 | Toyoda et al. |
| 7,537,698 B2 | 5/2009 | Sumino et al. |
| D594,955 S | 6/2009 | Noda |
| 7,540,722 B2 | 6/2009 | Nishikawa et al. |
| 7,540,959 B2 | 6/2009 | Sumino et al. |
| 7,543,769 B2 | 6/2009 | Shimizu et al. |
| 7,550,082 B2 | 6/2009 | Sumino et al. |
| 7,550,083 B2 | 6/2009 | Sumino et al. |
| 7,551,436 B2 | 6/2009 | Hata et al. |
| 7,553,153 B2 | 6/2009 | Okazaki et al. |
| 7,553,572 B2 | 6/2009 | Komachiya et al. |
| 7,559,742 B2 | 7/2009 | Inoue et al. |
| 7,569,617 B2 | 8/2009 | Mukaide et al. |
| 7,575,679 B2 | 8/2009 | Sumino et al. |
| D599,464 S | 9/2009 | Noda |
| 7,591,709 B2 | 9/2009 | Shimizu et al. |
| 7,599,545 B2 | 10/2009 | Shibata et al. |
| 7,601,252 B2 | 10/2009 | Yamazaki et al. |
| 7,601,317 B2 | 10/2009 | Orita et al. |
| 7,609,477 B2 | 10/2009 | Atarashi et al. |
| 7,611,676 B2 | 11/2009 | Inage et al. |
| 7,619,385 B2 | 11/2009 | Suzuki et al. |
| 7,622,010 B2 | 11/2009 | Kuniyoshi et al. |
| 7,641,867 B2 | 1/2010 | Irie et al. |
| 7,641,877 B2 | 1/2010 | Maekawa et al. |
| 7,651,249 B2 | 1/2010 | Ohashi et al. |
| 7,651,389 B2 | 1/2010 | Kikkawa et al. |
| 7,654,396 B2 | 2/2010 | Takeno et al. |
| 7,658,078 B2 | 2/2010 | Nishida et al. |
| 7,658,890 B2 | 2/2010 | Kokun et al. |
| 7,662,295 B2 | 2/2010 | Arato et al. |
| 7,665,408 B2 | 2/2010 | Okazaki et al. |
| 7,666,365 B2 | 2/2010 | Kokun et al. |
| 7,667,803 B2 | 2/2010 | Kobayashi et al. |
| 7,678,486 B2 | 3/2010 | Yamauchi et al. |
| 7,685,816 B2 | 3/2010 | Yabuki |
| 7,700,054 B2 | 4/2010 | Hayashida et al. |
| 7,707,816 B2 | 5/2010 | Takahashi et al. |
| 7,707,837 B2 | 5/2010 | Inui et al. |
| 7,712,576 B2 | 5/2010 | Goto et al. |
| 7,722,844 B2 | 5/2010 | Nakagawa et al. |
| 7,724,515 B2 | 5/2010 | Fukuda et al. |
| 7,727,780 B2 | 6/2010 | Sugishita et al. |
| 7,730,713 B2 | 6/2010 | Nakano et al. |
| 7,731,926 B2 | 6/2010 | Oda et al. |
| 7,745,952 B2 | 6/2010 | Nakatsu et al. |
| 7,748,078 B2 | 7/2010 | Andriolo et al. |
| 7,758,326 B2 | 7/2010 | Fujimura et al. |
| 7,767,124 B2 | 8/2010 | Goto et al. |
| 7,770,528 B2 | 8/2010 | Okazaki et al. |
| 7,776,141 B2 | 8/2010 | Wu et al. |
| 7,778,694 B2 | 8/2010 | Kaga et al. |
| 7,806,649 B2 | 10/2010 | Ishikawa et al. |
| 7,816,786 B2 | 10/2010 | Nakatsu et al. |
| 7,819,935 B2 | 10/2010 | Austin, Jr. et al. |
| 7,820,118 B2 | 10/2010 | Yamazaki et al. |
| 7,826,217 B2 | 11/2010 | Kondo et al. |
| 7,836,712 B2 | 11/2010 | Susao et al. |
| 7,839,113 B2 | 11/2010 | Maeda et al. |
| 7,841,434 B2 | 11/2010 | Shimada et al. |
| 7,843,525 B2 | 11/2010 | Tsumura et al. |
| 7,846,568 B2 | 12/2010 | Norimatsu et al. |
| 7,855,032 B2 | 12/2010 | Kamo et al. |
| 7,855,890 B2 | 12/2010 | Kashirajima et al. |
| 7,859,834 B2 | 12/2010 | Fukuda et al. |

(56) References Cited

U.S. PATENT DOCUMENTS

| | | | |
|---|---|---|---|
| 7,863,204 B2 | 1/2011 | Miyata et al. |
| 7,863,904 B2 | 1/2011 | Takeda et al. |
| 7,865,070 B2 | 1/2011 | Nakamura et al. |
| 7,870,640 B2 | 1/2011 | Hinklin et al. |
| 7,878,130 B2 | 2/2011 | Yamamoto et al. |
| 7,887,289 B2 | 2/2011 | Tokunaga et al. |
| 7,898,128 B2 | 3/2011 | Hattori et al. |
| 7,900,996 B2 | 3/2011 | Kimura et al. |
| 7,913,507 B2 | 3/2011 | Kondo et al. |
| 7,922,480 B2 | 4/2011 | Kiyama et al. |
| 7,922,518 B1 | 4/2011 | Takehara et al. |
| 7,925,028 B2 | 4/2011 | Yokoyama et al. |
| 7,926,288 B2 | 4/2011 | Yokota et al. |
| 7,931,756 B2 | 4/2011 | Kuniyoshi et al. |
| D638,035 S | 5/2011 | Kosugi et al. |
| 7,954,460 B2 | 6/2011 | Kimura et al. |
| 7,955,991 B2 | 6/2011 | Suzaki et al. |
| 7,966,727 B2 | 6/2011 | Kawashima et al. |
| 7,972,979 B2 | 7/2011 | Harada et al. |
| 7,976,622 B2 | 7/2011 | Oda et al. |
| 8,012,327 B2 | 9/2011 | Yamazaki et al. |
| 8,014,096 B2 | 9/2011 | Huang et al. |
| 8,033,714 B2 | 10/2011 | Nishioka et al. |
| 8,033,783 B2 | 10/2011 | Ishikawa et al. |
| 8,035,330 B2 | 10/2011 | Maeda et al. |
| 8,035,522 B2 | 10/2011 | Oroku et al. |
| 8,036,806 B2 | 10/2011 | Nakamura |
| 8,038,391 B2 | 10/2011 | Ishikawa et al. |
| 8,042,876 B2 | 10/2011 | Tamura et al. |
| 8,047,145 B2 | 11/2011 | Gretta et al. |
| 8,049,378 B2 | 11/2011 | Hattori et al. |
| 8,058,842 B2 | 11/2011 | Kai et al. |
| 8,074,765 B2 | 12/2011 | Goto et al. |
| 8,091,888 B2 | 1/2012 | Tamamoto |
| 8,092,582 B2 | 1/2012 | Ueda et al. |
| 8,095,479 B2 | 1/2012 | Sekiai et al. |
| 8,103,401 B2 | 1/2012 | Kubo et al. |
| 8,104,842 B2 | 1/2012 | Fushiki et al. |
| 8,105,540 B2 | 1/2012 | Goto et al. |
| 8,116,618 B2 | 2/2012 | Hayashida et al. |
| 8,137,856 B2 | 3/2012 | Yamaga et al. |
| 8,147,941 B2 | 4/2012 | Anzai et al. |
| 8,158,911 B2 | 4/2012 | Hayashida et al. |
| 8,159,184 B2 | 4/2012 | Emori et al. |
| 8,159,622 B2 | 4/2012 | Tanaka et al. |
| 8,163,052 B2 | 4/2012 | Ono |
| 8,172,931 B2 | 5/2012 | Ueda et al. |
| 8,172,950 B2 | 5/2012 | Yanagisawa et al. |
| 8,173,313 B2 | 5/2012 | Nishimura et al. |
| 8,178,019 B2 | 5/2012 | Aramaki et al. |
| 8,182,610 B2 | 5/2012 | Takahara et al. |
| 8,192,970 B2 | 6/2012 | Sumino et al. |
| 8,199,504 B2 | 6/2012 | Kashirajima et al. |
| 8,207,704 B2 | 6/2012 | Kai et al. |
| 8,212,571 B2 | 7/2012 | Emori et al. |
| 8,230,828 B2 | 7/2012 | Yoshino et al. |
| 8,231,731 B2 | 7/2012 | Suzuki et al. |
| 8,231,851 B2 | 7/2012 | Irie et al. |
| 8,245,749 B2 | 8/2012 | Imai et al. |
| 8,246,803 B2 | 8/2012 | Yamazaki et al. |
| 8,251,298 B2 | 8/2012 | Tatehira et al. |
| 8,251,644 B2 | 8/2012 | Wada et al. |
| 8,257,044 B2 | 9/2012 | Hayasaka et al. |
| 8,262,370 B2 | 9/2012 | Kageback et al. |
| 8,264,204 B2 | 9/2012 | Nagaoka et al. |
| 8,279,359 B2 | 10/2012 | Tanaka et al. |
| 8,293,109 B2 | 10/2012 | Kimura et al. |
| 8,297,921 B2 | 10/2012 | Tokunaga et al. |
| 8,303,817 B2 | 11/2012 | Isaka et al. |
| 8,313,290 B2 | 11/2012 | Tanaka et al. |
| 8,337,779 B2 | 12/2012 | Miyashita |
| 8,338,050 B2 | 12/2012 | Suzuki et al. |
| 8,338,997 B2 | 12/2012 | Nishikawa |
| 8,342,782 B2 | 1/2013 | Nishikawa et al. |
| 8,344,332 B2 | 1/2013 | Eguchi et al. |
| 8,359,704 B2 | 1/2013 | Yamazaki et al. |
| 8,360,016 B2 | 1/2013 | Wada et al. |
| 8,382,873 B2 | 2/2013 | Ono |
| 8,388,845 B2 | 3/2013 | Isaka et al. |
| 8,392,756 B2 | 3/2013 | Nakayama et al. |
| 8,393,065 B2 | 3/2013 | Tatsumi et al. |
| 8,401,728 B2 | 3/2013 | Kubo et al. |
| 8,416,571 B2 | 4/2013 | Mizumura et al. |
| 8,423,111 B2 | 4/2013 | Fujiwara |
| 8,426,047 B2 | 4/2013 | Emori et al. |
| 8,439,005 B2 | 5/2013 | Yasutomi et al. |
| 8,459,932 B2 | 6/2013 | Nakano et al. |
| 8,481,434 B2 | 7/2013 | Miya et al. |
| 8,485,811 B2 | 7/2013 | Shimao et al. |
| 8,496,742 B2 | 7/2013 | Kouishi et al. |
| 8,499,730 B2 | 8/2013 | Yasutomi et al. |
| 8,500,912 B2 | 8/2013 | Hirota |
| 8,501,599 B2 | 8/2013 | Ueno et al. |
| 8,507,296 B2 | 8/2013 | Ueno et al. |
| 8,511,258 B2 | 8/2013 | Yamamoto et al. |
| 8,518,570 B2 | 8/2013 | Kudo et al. |
| 8,525,120 B2 | 9/2013 | Iwamoto |
| 8,529,169 B2 | 9/2013 | Nishikawa et al. |
| 8,536,809 B2 | 9/2013 | Kojima et al. |
| 8,540,042 B2 | 9/2013 | Atarashi et al. |
| 8,545,686 B2 | 10/2013 | Inaba et al. |
| 8,550,043 B2 | 10/2013 | Naganuma et al. |
| 8,572,430 B2 | 10/2013 | Nakamura et al. |
| 8,580,039 B2 | 11/2013 | Saeki et al. |
| 8,591,194 B2 | 11/2013 | Hayasaka et al. |
| 8,616,619 B2 | 12/2013 | Kimura et al. |
| 8,636,882 B2 | 1/2014 | Suzuki et al. |
| 8,637,199 B2 | 1/2014 | Nishimura et al. |
| 8,647,784 B2 | 2/2014 | Nishimura et al. |
| 8,649,935 B2 | 2/2014 | Kubo et al. |
| 8,656,719 B2 | 2/2014 | Kosaka et al. |
| 8,658,323 B2 | 2/2014 | Fujimura et al. |
| 8,672,082 B2 | 3/2014 | Kashu et al. |
| 8,677,181 B2 | 3/2014 | Nakayama et al. |
| 8,691,466 B2 | 4/2014 | Suzuki et al. |
| 8,701,621 B2 | 4/2014 | Takeda et al. |
| 8,714,359 B2 | 5/2014 | Aizawa et al. |
| 8,721,298 B2 | 5/2014 | Tanimoto et al. |
| 8,728,187 B2 | 5/2014 | Ono |
| 8,734,148 B2 | 5/2014 | Yamazaki et al. |
| 8,741,034 B2 | 6/2014 | Konishi et al. |
| 8,741,783 B2 | 6/2014 | Kameda et al. |
| 8,747,733 B2 | 6/2014 | Oikawa et al. |
| 8,752,385 B2 | 6/2014 | Kaneeda et al. |
| 8,770,589 B2 | 7/2014 | Hashimoto et al. |
| 8,771,482 B2 | 7/2014 | Bailey et al. |
| 8,802,274 B2 | 8/2014 | Yoshida et al. |
| 8,829,717 B2 | 9/2014 | Kudo et al. |
| 8,839,638 B2 | 9/2014 | Kashirajima et al. |
| 8,839,894 B2 | 9/2014 | Yokoyama et al. |
| 8,918,956 B2 * | 12/2014 | Pellenc ............... A01G 20/47 15/405 |
| 2001/0008439 A1 | 7/2001 | Konuma et al. |
| 2001/0015194 A1 | 8/2001 | Shiraishi et al. |
| 2001/0028241 A1 | 10/2001 | Saito et al. |
| 2001/0054847 A1 | 12/2001 | Yoshida et al. |
| 2002/0043964 A1 | 4/2002 | Saito et al. |
| 2002/0092508 A1 | 7/2002 | Kanekawa et al. |
| 2002/0100791 A1 | 8/2002 | Mukuno et al. |
| 2002/0112924 A1 | 8/2002 | Mori et al. |
| 2002/0113492 A1 | 8/2002 | Sakamoto et al. |
| 2002/0122750 A1 | 9/2002 | Kanno et al. |
| 2002/0131913 A1 | 9/2002 | Tamata et al. |
| 2002/0144671 A1 | 10/2002 | Shiraishi et al. |
| 2002/0170432 A1 | 11/2002 | Cartellone |
| 2003/0001434 A1 | 1/2003 | Saito et al. |
| 2003/0004391 A1 | 1/2003 | Anazawa et al. |
| 2003/0019585 A1 | 1/2003 | Tometsuka |
| 2003/0098211 A1 | 5/2003 | Saito et al. |
| 2003/0116352 A1 | 6/2003 | Nakatsuka et al. |
| 2003/0131895 A1 | 7/2003 | Mitomo et al. |
| 2003/0133760 A1 | 7/2003 | Fukushima et al. |
| 2003/0133761 A1 | 7/2003 | Fukushima et al. |
| 2003/0147769 A1 | 8/2003 | Kiyotoki et al. |

(56) References Cited

U.S. PATENT DOCUMENTS

| | | |
|---|---|---|
| 2003/0172646 A1 | 9/2003 | Hiratsuka et al. |
| 2003/0180175 A1 | 9/2003 | Kiyotoki et al. |
| 2003/0206276 A1 | 11/2003 | Konuma et al. |
| 2003/0231898 A1 | 12/2003 | Asaoka et al. |
| 2004/0025852 A1 | 2/2004 | Kanekawa et al. |
| 2004/0032563 A1 | 2/2004 | Nakasu et al. |
| 2004/0065096 A1 | 4/2004 | Sakuma et al. |
| 2004/0112119 A1 | 6/2004 | Watanabe et al. |
| 2004/0159721 A1 | 8/2004 | Shiraishi et al. |
| 2004/0165909 A1 | 8/2004 | Asaoka et al. |
| 2004/0211345 A1 | 10/2004 | Okazaki et al. |
| 2005/0014989 A1 | 1/2005 | Anazawa et al. |
| 2005/0074656 A1 | 4/2005 | Koyama et al. |
| 2005/0079392 A1 | 4/2005 | Norimatsu et al. |
| 2005/0083490 A1 | 4/2005 | Konuma et al. |
| 2005/0089461 A1 | 4/2005 | Kanno et al. |
| 2005/0089734 A1 | 4/2005 | Norimatsu et al. |
| 2005/0092220 A1 | 5/2005 | Okazaki et al. |
| 2005/0114876 A1 | 5/2005 | Atarashi et al. |
| 2005/0168072 A1 | 8/2005 | Saito et al. |
| 2005/0208358 A1 | 9/2005 | Nishimura et al. |
| 2005/0241100 A1 | 11/2005 | Park |
| 2005/0242276 A1 | 11/2005 | Okazaki et al. |
| 2005/0242464 A1 | 11/2005 | Goto et al. |
| 2005/0254941 A1 | 11/2005 | Inoue et al. |
| 2005/0257721 A1 | 11/2005 | Okazaki et al. |
| 2005/0261470 A1 | 11/2005 | Goto et al. |
| 2006/0017188 A1 | 1/2006 | Ishikawara et al. |
| 2006/0091073 A1 | 5/2006 | Sumino et al. |
| 2006/0096863 A1 | 5/2006 | Yamazaki et al. |
| 2006/0096915 A1 | 5/2006 | Sumino et al. |
| 2006/0115779 A1 | 6/2006 | Yamamoto et al. |
| 2006/0122793 A1 | 6/2006 | Tamata et al. |
| 2006/0191846 A1 | 8/2006 | Sumino et al. |
| 2006/0232942 A1 | 10/2006 | Nakatsu et al. |
| 2006/0243427 A1 | 11/2006 | Kitajima et al. |
| 2006/0245296 A1 | 11/2006 | Nishioka et al. |
| 2006/0257251 A1* | 11/2006 | Carlson ............... F04D 29/661 415/178 |
| 2007/0026356 A1 | 2/2007 | Okazaki et al. |
| 2007/0032045 A1 | 2/2007 | Kasahara et al. |
| 2007/0053154 A1 | 3/2007 | Fukuda et al. |
| 2007/0079736 A1 | 4/2007 | Okazaki |
| 2007/0089295 A1 | 4/2007 | Kawashima et al. |
| 2007/0089296 A1 | 4/2007 | TAtehira et al. |
| 2007/0092847 A1 | 4/2007 | Okazaki et al. |
| 2007/0096278 A1 | 5/2007 | Nakatsu et al. |
| 2007/0110837 A1 | 5/2007 | Goto et al. |
| 2007/0122235 A1 | 5/2007 | Kasahara et al. |
| 2007/0163882 A1 | 7/2007 | Yamazaki et al. |
| 2007/0170063 A1 | 7/2007 | Yamazaki et al. |
| 2007/0205677 A1 | 9/2007 | Iwashige et al. |
| 2007/0218808 A1 | 9/2007 | Shimizu et al. |
| 2007/0218809 A1 | 9/2007 | Shimizu et al. |
| 2007/0218816 A1 | 9/2007 | Shimizu et al. |
| 2007/0227789 A1 | 10/2007 | Imura et al. |
| 2007/0259532 A1 | 11/2007 | Suzaki et al. |
| 2007/0283701 A1 | 12/2007 | Yokota et al. |
| 2008/0023401 A1 | 1/2008 | Arato et al. |
| 2008/0050645 A1 | 2/2008 | Kai et al. |
| 2008/0070486 A1 | 3/2008 | Shimizu et al. |
| 2008/0105204 A1 | 5/2008 | Nakada et al. |
| 2008/0153314 A1 | 6/2008 | Hayashida et al. |
| 2008/0164187 A1 | 7/2008 | Sumino et al. |
| 2008/0164196 A1 | 7/2008 | Sumino et al. |
| 2008/0182345 A1 | 7/2008 | Sugishita et al. |
| 2008/0199378 A1 | 8/2008 | Orita et al. |
| 2008/0209671 A1 | 9/2008 | Conrad |
| 2008/0230305 A1 | 9/2008 | Goto et al. |
| 2008/0259563 A1 | 10/2008 | Fukuda et al. |
| 2008/0267598 A1 | 10/2008 | Nakamura et al. |
| 2008/0284375 A1 | 11/2008 | Nagaoka et al. |
| 2008/0285290 A1 | 11/2008 | Ohashi et al. |
| 2008/0286846 A1 | 11/2008 | Sumino et al. |
| 2008/0288217 A1 | 11/2008 | Akao |
| 2008/0302505 A1 | 12/2008 | Kato et al. |
| 2008/0307602 A1* | 12/2008 | Andriolo ............... E01H 1/0809 15/330 |
| 2008/0311016 A1 | 12/2008 | Maekawa et al. |
| 2009/0008308 A1 | 1/2009 | Sumino et al. |
| 2009/0008313 A1 | 1/2009 | Sumino et al. |
| 2009/0011606 A1 | 1/2009 | Shinozaki |
| 2009/0014428 A1 | 1/2009 | Hayashida et al. |
| 2009/0014435 A1 | 1/2009 | Hayashida et al. |
| 2009/0016706 A1 | 1/2009 | Hayashida et al. |
| 2009/0017251 A1 | 1/2009 | Anzai et al. |
| 2009/0017641 A1 | 1/2009 | Yanagisawa et al. |
| 2009/0029486 A1 | 1/2009 | Ueno et al. |
| 2009/0035948 A1 | 2/2009 | Miyata et al. |
| 2009/0085516 A1 | 4/2009 | Emori et al. |
| 2009/0087722 A1 | 4/2009 | Sakabe et al. |
| 2009/0087805 A1 | 4/2009 | Ochi et al. |
| 2009/0091332 A1 | 4/2009 | Emori et al. |
| 2009/0091883 A1 | 4/2009 | Fukuda et al. |
| 2009/0095422 A1 | 4/2009 | Sugishita et al. |
| 2009/0100905 A1 | 4/2009 | Tamata et al. |
| 2009/0111285 A1 | 4/2009 | Yamazaki et al. |
| 2009/0115919 A1 | 5/2009 | Tanaka et al. |
| 2009/0130541 A1 | 5/2009 | Emori et al. |
| 2009/0130860 A1 | 5/2009 | Miya et al. |
| 2009/0148246 A1 | 6/2009 | Nishikawa et al. |
| 2009/0148248 A1 | 6/2009 | Nishikawa et al. |
| 2009/0149032 A1 | 6/2009 | Kameda et al. |
| 2009/0151309 A1 | 6/2009 | Austin, Jr. et al. |
| 2009/0160048 A1 | 6/2009 | Nakatsu et al. |
| 2009/0170328 A1 | 7/2009 | Kameda et al. |
| 2009/0173234 A1 | 7/2009 | Ueda et al. |
| 2009/0197352 A1 | 8/2009 | Ueno et al. |
| 2009/0198399 A1 | 8/2009 | Kubo et al. |
| 2009/0201645 A1 | 8/2009 | Kashirajima et al. |
| 2009/0220401 A1 | 9/2009 | Nakagawa et al. |
| 2009/0228187 A1 | 9/2009 | Nakamura |
| 2009/0263305 A1 | 10/2009 | Oda et al. |
| 2009/0277334 A1 | 11/2009 | Oda et al. |
| 2009/0317248 A1 | 12/2009 | Tanaka et al. |
| 2009/0320687 A1 | 12/2009 | Ueda et al. |
| 2010/0001573 A1 | 1/2010 | Fushiki et al. |
| 2010/0001737 A1 | 1/2010 | Kubo et al. |
| 2010/0021335 A1 | 1/2010 | Kuniyoshi et al. |
| 2010/0033695 A1 | 2/2010 | Kanno et al. |
| 2010/0037875 A1 | 2/2010 | Yasutomi et al. |
| 2010/0037877 A1 | 2/2010 | Yasutomi et al. |
| 2010/0038311 A1 | 2/2010 | Abe et al. |
| 2010/0077925 A1 | 4/2010 | Konishi et al. |
| 2010/0102594 A1 | 4/2010 | Klmura et al. |
| 2010/0123359 A1 | 5/2010 | Nishikawa |
| 2010/0154711 A1 | 6/2010 | Ishibashi et al. |
| 2010/0187037 A1 | 7/2010 | Goto et al. |
| 2010/0209748 A1 | 8/2010 | Kudo et al. |
| 2010/0209803 A1 | 8/2010 | Yamaga et al. |
| 2010/0223926 A1 | 9/2010 | Orita et al. |
| 2010/0230348 A1 | 9/2010 | Isaka et al. |
| 2010/0236082 A1 | 9/2010 | Naganuma et al. |
| 2010/0243562 A1 | 9/2010 | Kimura et al. |
| 2010/0243565 A1 | 9/2010 | Isaka et al. |
| 2010/0260881 A1 | 10/2010 | Goto et al. |
| 2010/0269741 A1 | 10/2010 | Okazaki et al. |
| 2010/0281862 A1 | 11/2010 | Shiraishi et al. |
| 2010/0291448 A1 | 11/2010 | Yamaga et al. |
| 2010/0303658 A1 | 12/2010 | Ito et al. |
| 2011/0048454 A1 | 3/2011 | Saeki et al. |
| 2011/0053024 A1 | 3/2011 | Nishimura et al. |
| 2011/0056223 A1 | 3/2011 | Kashirajima et al. |
| 2011/0065288 A1 | 3/2011 | Harada et al. |
| 2011/0076591 A1 | 3/2011 | Suzuki et al. |
| 2011/0094051 A1 | 4/2011 | Gripske et al. |
| 2011/0094105 A1 | 4/2011 | Tatsumi et al. |
| 2011/0106358 A1 | 5/2011 | Sawada et al. |
| 2011/0123897 A1 | 5/2011 | Kawaji et al. |
| 2011/0127027 A1 | 6/2011 | Kashirajima et al. |
| 2011/0174709 A1 | 7/2011 | Mori et al. |
| 2011/0193413 A1 | 8/2011 | Kudo et al. |
| 2011/0197831 A1 | 8/2011 | Ohyatsu et al. |
| 2011/0207339 A1 | 8/2011 | Yamazaki et al. |

(56) References Cited

U.S. PATENT DOCUMENTS

| | | |
|---|---|---|
| 2011/0217852 A1 | 9/2011 | Suzaki et al. |
| 2011/0217917 A1 | 9/2011 | Sulva |
| 2011/0223452 A1 | 9/2011 | Yoshida et al. |
| 2011/0223693 A1 | 9/2011 | Sugishita |
| 2011/0271695 A1 | 11/2011 | Kashirajima et al. |
| 2011/0279976 A1 | 11/2011 | Mikami et al. |
| 2011/0308262 A1 | 12/2011 | Inadomi et al. |
| 2011/0314325 A1 | 12/2011 | Nakayama et al. |
| 2011/0314853 A1 | 12/2011 | Ito et al. |
| 2012/0024517 A1 | 2/2012 | Imanishi et al. |
| 2012/0025769 A1 | 2/2012 | Kikuchi et al. |
| 2012/0031147 A1 | 2/2012 | Arai et al. |
| 2012/0034570 A1 | 2/2012 | Yasui et al. |
| 2012/0050993 A1 | 3/2012 | Suzuki et al. |
| 2012/0052203 A1 | 3/2012 | Miyashita et al. |
| 2012/0052345 A1 | 3/2012 | Kai et al. |
| 2012/0067661 A1 | 3/2012 | Kashu et al. |
| 2012/0073080 A1 | 3/2012 | Yokoyama |
| 2012/0076936 A1 | 3/2012 | Hirano |
| 2012/0082915 A1 | 4/2012 | Kozakai et al. |
| 2012/0083120 A1 | 4/2012 | Nakada et al. |
| 2012/0085366 A1 | 4/2012 | Hirota |
| 2012/0094157 A1 | 4/2012 | Seto |
| 2012/0111303 A1 | 5/2012 | Toshihide et al. |
| 2012/0133370 A1 | 5/2012 | Kubo et al. |
| 2012/0140402 A1 | 6/2012 | Mizumura et al. |
| 2012/0141848 A1 | 6/2012 | Nagaoka et al. |
| 2012/0151262 A1 | 6/2012 | Nakayama et al. |
| 2012/0160666 A1 | 6/2012 | Wiedmeyer et al. |
| 2012/0160668 A1 | 6/2012 | Bailey et al. |
| 2012/0164554 A1 | 6/2012 | Suzuki et al. |
| 2012/0178354 A1 | 7/2012 | Ono |
| 2012/0200241 A1 | 8/2012 | Kojima et al. |
| 2012/0214041 A1 | 8/2012 | Harada et al. |
| 2012/0218711 A1 | 8/2012 | Kashirajima et al. |
| 2012/0222441 A1 | 9/2012 | Sawada et al. |
| 2012/0227406 A1 | 9/2012 | Kosaka et al. |
| 2012/0263599 A1 | 10/2012 | Sugimura et al. |
| 2012/0264027 A1 | 10/2012 | Mizukami et al. |
| 2012/0264029 A1 | 10/2012 | Takamori et al. |
| 2012/0291465 A1 | 11/2012 | Kashirajima et al. |
| 2012/0294404 A1 | 11/2012 | Wada et al. |
| 2012/0299676 A1 | 11/2012 | Niinae et al. |
| 2012/0301311 A1 | 11/2012 | Hayasaka et al. |
| 2012/0301569 A1 | 11/2012 | Hasegawa et al. |
| 2012/0321478 A1 | 12/2012 | Oikawa et al. |
| 2012/0326394 A1 | 12/2012 | Hashimoto et al. |
| 2013/0011232 A1 | 1/2013 | Tabeta et al. |
| 2013/0017040 A1 | 1/2013 | Ohkubo et al. |
| 2013/0017048 A1 | 1/2013 | Kimura et al. |
| 2013/0017078 A1 | 1/2013 | Armstrong et al. |
| 2013/0019840 A1 | 1/2013 | Kawada et al. |
| 2013/0020730 A1 | 1/2013 | Muramoto et al. |
| 2013/0052096 A1 | 2/2013 | Konishi et al. |
| 2013/0052560 A1 | 2/2013 | Kawaji et al. |
| 2013/0055937 A1 | 3/2013 | Mitsui et al. |
| 2013/0056396 A1 | 3/2013 | Aizawa et al. |
| 2013/0062883 A1 | 3/2013 | Kaneeda et al. |
| 2013/0065402 A1 | 3/2013 | Kameda et al. |
| 2013/0066501 A1 | 3/2013 | Oyama et al. |
| 2013/0075170 A1 | 3/2013 | Minoshima et al. |
| 2013/0084162 A1 | 4/2013 | Sano et al. |
| 2013/0084512 A1 | 4/2013 | Suzuki et al. |
| 2013/0089413 A1 | 4/2013 | Fujimoto et al. |
| 2013/0091812 A1 | 4/2013 | Smith |
| 2013/0094150 A1 | 4/2013 | Shinomiya et al. |
| 2013/0118820 A1 | 5/2013 | Yokoyama et al. |
| 2013/0125339 A1 | 5/2013 | Yokote et al. |
| 2013/0125929 A1 | 5/2013 | Inada et al. |
| 2013/0139000 A1 | 5/2013 | Nakamura et al. |
| 2013/0143477 A1 | 6/2013 | Ono |
| 2013/0160740 A1 | 6/2013 | Kamimura et al. |
| 2013/0161186 A1 | 6/2013 | Berger et al. |
| 2013/0170600 A1 | 7/2013 | Siewert et al. |
| 2013/0173105 A1 | 7/2013 | Kojima |
| 2013/0177791 A1 | 7/2013 | Takahashi et al. |
| 2013/0180476 A1 | 7/2013 | Ichihashi |
| 2013/0185892 A1 | 7/2013 | Walker |
| 2013/0187659 A1 | 7/2013 | Kubo et al. |
| 2013/0205536 A1* | 8/2013 | Robichaux ............ A01G 20/43 15/327.1 |
| 2013/0212830 A1 | 8/2013 | Stones et al. |
| 2013/0213356 A1 | 8/2013 | Murakami |
| 2013/0238141 A1 | 9/2013 | Shimizu |
| 2013/0244190 A1 | 9/2013 | Marumoto et al. |
| 2013/0255443 A1 | 10/2013 | Han et al. |
| 2013/0259694 A1 | 10/2013 | Hirano et al. |
| 2013/0260212 A1 | 10/2013 | Kohno et al. |
| 2013/0276260 A1 | 10/2013 | Osterchill et al. |
| 2013/0277228 A1 | 10/2013 | Loewen et al. |
| 2013/0284021 A1 | 10/2013 | Miyamoto et al. |
| 2013/0285486 A1 | 10/2013 | Imanishi et al. |
| 2013/0287602 A1 | 10/2013 | Suzuki et al. |
| 2013/0292251 A1 | 11/2013 | Yamazaki et al. |
| 2013/0298897 A1 | 11/2013 | Kawane et al. |
| 2013/0302125 A1 | 11/2013 | Tabeta et al. |
| 2013/0317654 A1 | 11/2013 | Kashirajima et al. |
| 2013/0319029 A1 | 12/2013 | Sekiya et al. |
| 2013/0327025 A1 | 12/2013 | Shimamura et al. |
| 2013/0340535 A1 | 12/2013 | Sano et al. |
| 2013/0340659 A1 | 12/2013 | Ochi et al. |
| 2014/0000300 A1 | 1/2014 | Ito et al. |
| 2014/0026791 A1 | 1/2014 | Okazaki et al. |
| 2014/0027542 A1 | 1/2014 | Yoshimura et al. |
| 2014/0049204 A1 | 2/2014 | Ito et al. |
| 2014/0050600 A1 | 2/2014 | Kodato et al. |
| 2014/0050630 A1 | 2/2014 | Asano et al. |
| 2014/0050963 A1 | 2/2014 | Ishikawa et al. |
| 2014/0064427 A1 | 3/2014 | Noshita et al. |
| 2014/0070568 A1 | 3/2014 | Tabeta et al. |
| 2014/0082882 A1 | 3/2014 | Kawamata et al. |
| 2014/0088823 A1 | 3/2014 | Kubo et al. |
| 2014/0116737 A1 | 5/2014 | Iwata et al. |
| 2014/0124280 A1 | 5/2014 | Kimura et al. |
| 2014/0199471 A1 | 7/2014 | Funayama et al. |
| 2014/0206204 A1 | 7/2014 | Nakagawa |
| 2014/0230181 A1* | 8/2014 | Yamaoka ............ E01H 1/0809 15/344 |
| 2014/0256160 A1 | 9/2014 | Wada et al. |
| 2014/0261255 A1 | 9/2014 | Ichihashi |
| 2014/0290251 A1 | 10/2014 | Sugasawa et al. |
| 2015/0003966 A1* | 1/2015 | Duquette ............ F04D 29/30 415/119 |
| 2018/0238351 A1* | 8/2018 | Kono ............ F04D 29/30 |

FOREIGN PATENT DOCUMENTS

| | | |
|---|---|---|
| EP | 0 922 429 | 6/1999 |
| EP | 1 591 052 | 11/2005 |
| EP | 2 027 766 | 2/2009 |
| EP | 2 546 526 | 1/2013 |
| EP | 2 581 022 | 4/2013 |
| JP | 4899033 | 1/2012 |
| WO | 97 30620 | 8/1997 |
| WO | 2012047228 | 4/2012 |
| WO | 2012111318 | 8/2012 |

* cited by examiner

BLOWER/VACUUM

CROSS REFERENCE TO RELATED APPLICATION

This application claims the priority benefit of U.S. Provisional Patent Application Ser. No. 62/089,572 filed Dec. 9, 2014.

FIELD OF THE INVENTION

The present invention is directed to a handheld yard maintenance tool, and more particularly, to a portable combined blower and vacuum.

BACKGROUND OF THE INVENTION

Combined blower/vacuums are commonly used in lawn care and maintenance. These combined blower/vacuums allow an operator to switch operations between a blower for blowing leaves, cut grass, or other debris and a vacuum which can suck up the leaves, cut grass, or other debris. Typical blower/vacuums usually require a single component attachable to a base having a power source located therewithin. One method allows an operator to switch between blowing and vacuuming functions by detaching the component(s) associated with one operation and affixing the components associated with the other. The design of the components makes the method for switching between functions very cumbersome and difficult for the operator. Another method incorporates both the blower nozzle and vacuum tube combined in a single tool. This combined component is often cumbersome and weighty which causes an operator to tire more easily. The combined component also requires the operator to carry the additional inactive component during operation of the other.

Combined blower/vacuums typically includes a single fan that rotates within a housing. In the combined blower nozzle with a vacuum tube design, a switch or other mechanism operates a diverter that diverts the air flow within the housing through either a first port for the blowing operation or a second port for the vacuum operation (in which air is drawn from the first port). The use of a single fan within a housing in which the flow is diverted depending upon the user-selected operation often leads to inefficiencies in the pressure of the air flow in either or both operations, particularly if the direction of air flow is turned by the diverter.

BRIEF SUMMARY OF THE INVENTION

A need therefore exists for a combined blower/vacuum that allows an operator to selectively switch between operations easily without the need to carry around additional components that are not being used in the chosen operation.

A need also exists for a combined blower/vacuum that incorporates two distinct fans in which each fan is dedicated to only one of the selectable operations, thereby increasing the efficiency of both fans.

In one aspect of the present invention, a blower/vacuum is provided. The blower/vacuum includes a base having a handle, a housing, and power source positioned within the housing. The power source has a drive shaft extending therefrom, wherein the drive shaft is rotatable by the power source. The blower/vacuum also includes a fan member has a first fan and a second fan. The fan member is rotatable by the drive shaft. A blower assembly is attachable to the base. The blower assembly utilizes the first fan in a blower configuration. A vacuum assembly is attachable to the base. The vacuum assembly utilizes the second fan in a vacuum configuration.

In another aspect of the present invention, a blower/vacuum is provided. The blower/vacuum includes a base having a housing in which a power source is located, a handle extending from the housing, a throttle for controlling the power source, and an attachment shell operatively connected to the housing, wherein the power source includes a rotatable drive shaft extending therefrom. The blower/vacuum also includes a fan member operatively connected to the drive shaft, wherein the fan member is rotatable by the drive shaft. The fan member including a first fan, a second fan, and a plate separating the first and second fans. A blower assembly is releasable attachable to the attachment shell of the base to provide a blower configuration. A vacuum assembly is releasable attachable to the attachment shell of the base to provide a vacuum assembly configuration. Only one of the blower assembly and the vacuum assembly is attachable to the attachment shell at a time.

In a further aspect of the present invention, a blower/vacuum is provided. The blower/vacuum includes a base having a housing, a power source located within the housing, a rotatable drive shaft extending from the power source, a handle extending from the housing, a throttle operatively connected to the handle for controlling the power source, a shield extending from the housing, and an attachment shell attached to the shield. The blower/vacuum also includes a fan member operatively connected to the drive shaft. The fan member includes a central hub that receives the drive shaft, a first fan having a plurality of first fan blades extending from the central hub, and a second fan having a plurality of second fan blades extending from the central hub. A blower assembly is releasably attachable to the attachment shell to provide a blower configuration. The blower assembly includes a diffuser that blocks air flow from the second fan in the blower configuration. A vacuum assembly is releasably attachable to the attachment shell to provide a vacuum configuration. The vacuum assembly includes a vacuum housing that blocks air flow from the first fan in the vacuum configuration. Only one of the blower assembly and the vacuum assembly is attachable to the attachment shell at a time.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
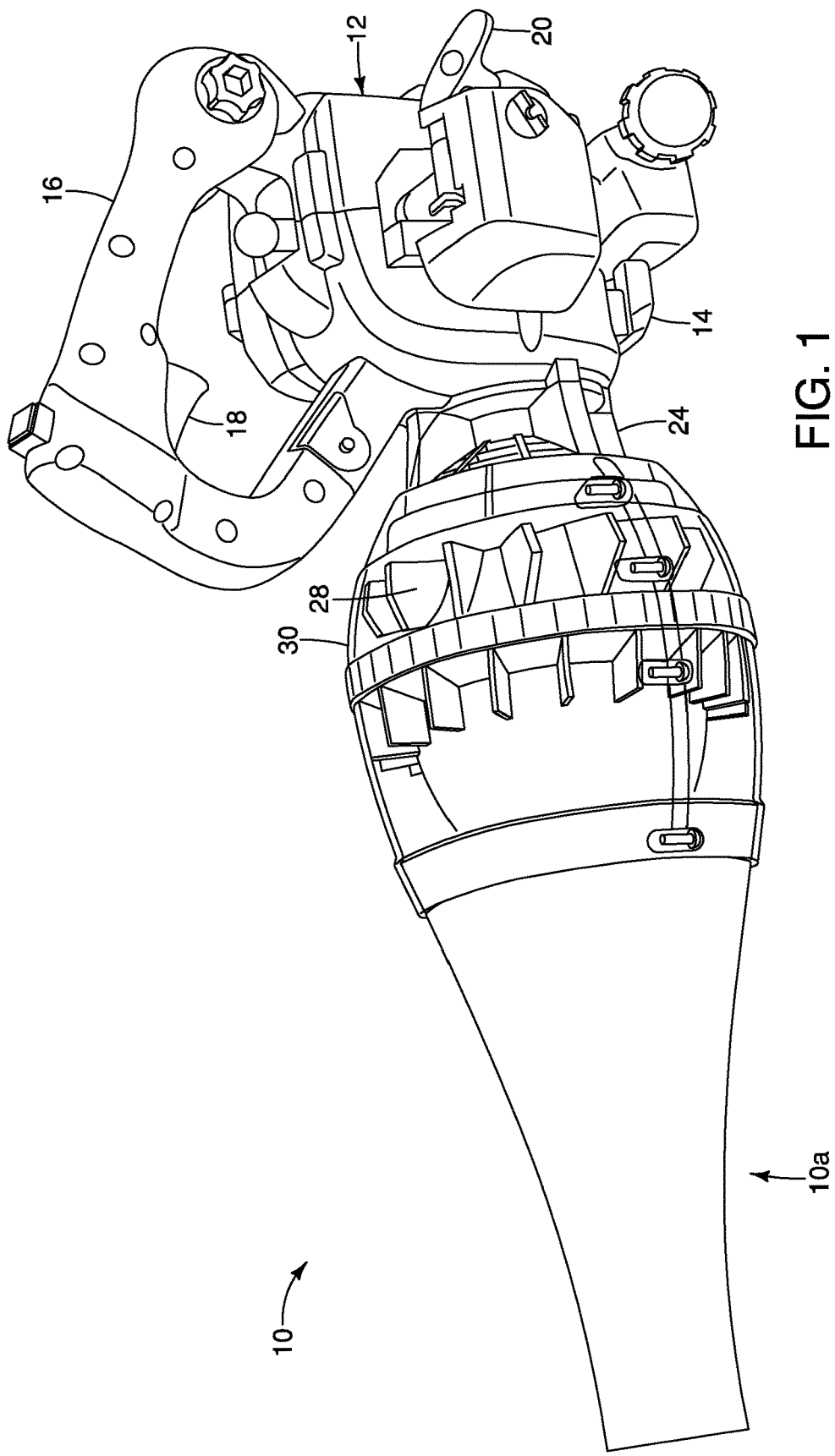
FIG. 1 is a perspective view of an embodiment of a blower/vacuum in a blower configuration.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
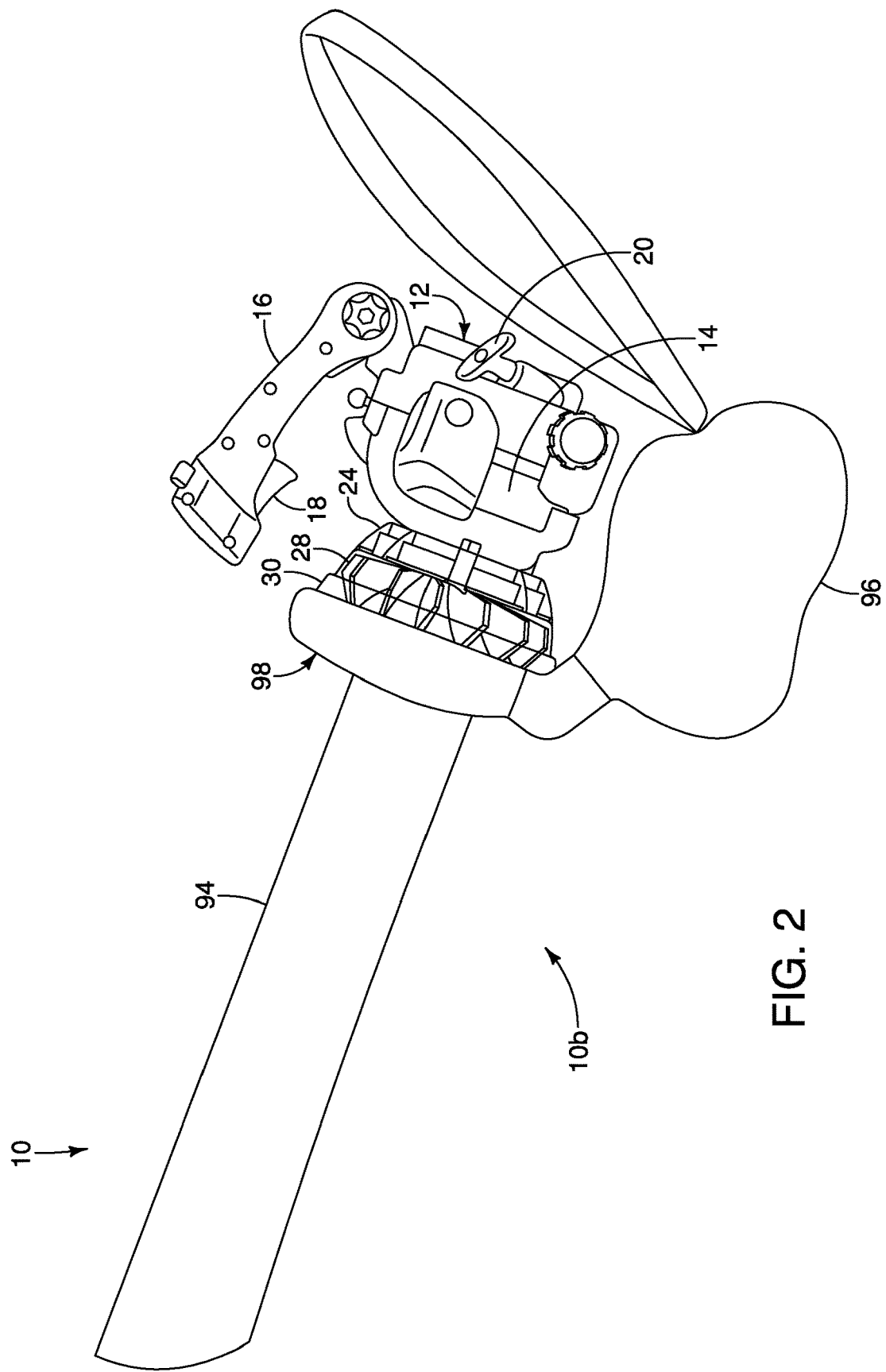
FIG. 2 is a perspective view of another embodiment of a blower/vacuum in a vacuum configuration.
Figure 3:
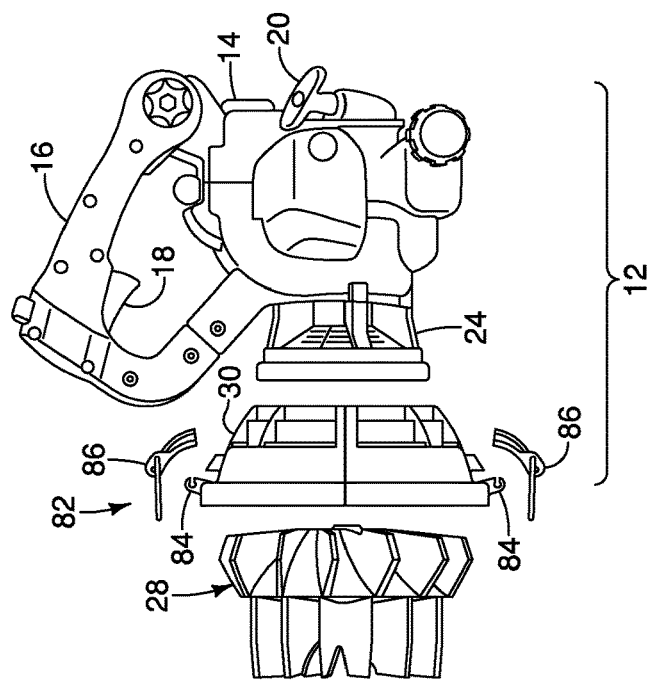
FIG. 3 is an exploded view of a blower/vacuum with both a blower assembly and a vacuum assembly.
Figure 3:
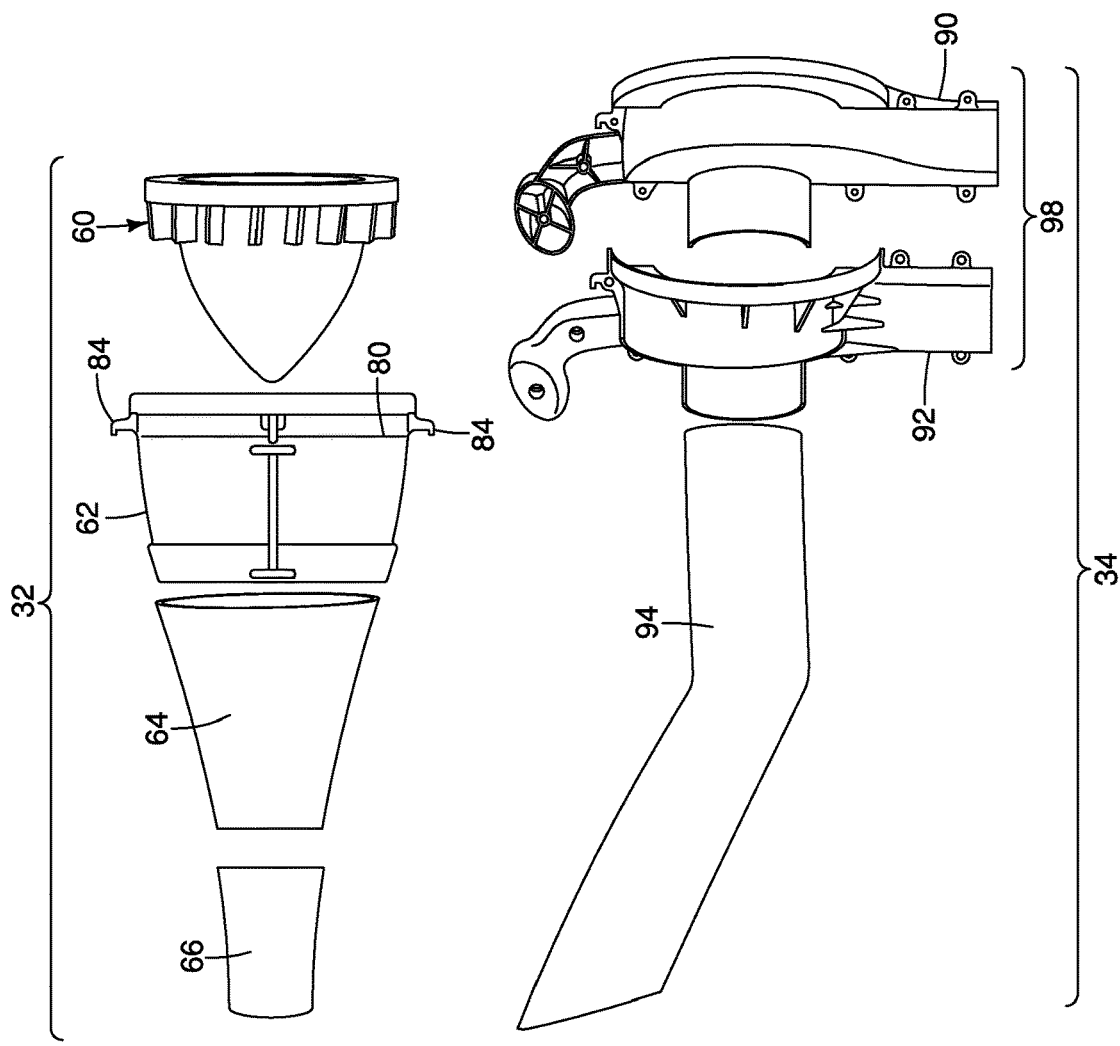

Referring to FIGS. 1-3, an exemplary embodiment of a combination of a blower and a vacuum, or a blower/vacuum 10, for use in lawn care and maintenance. The blower/vacuum 10 is configured to be used as both a blower 10a (FIG. 1) in a blower operation and configuration to blow leaves or other debris when in one configuration and a vacuum 10b (FIG. 2) in a vacuum operation and configuration for collecting and mulching leaves, grass, and other yard debris. The blower/vacuum 10 is switchable by an operator between the blower configuration 10a and the vacuum configuration 10b. The blower 10a and vacuum 10b utilize the same base 12, and the removably attachable end that is connected to the base 12 determines the configuration and operation of the blower/vacuum 10.

As shown in FIGS. 1-3, an exemplary embodiment of the base 12 includes a housing 14, a graspable handle 16, a user-controlled trigger 18, a starter assembly 20, a power source 22 positioned within the housing 14, a shield 24, and an attachment shell 30. Although the embodiment shown in FIGS. 1-3 illustrates the power source 22 as an internal combustion engine having starter assembly 20, it should be understood by one having ordinary skill in the art that the power source may also be an engine having a push-button start, an electric motor powered by a rechargeable battery, a replaceable battery, an A/C-powered electric motor, or any other power source capable of providing sufficient power to operate the handheld tool. In an embodiment, the housing 14 and handle 16 are integrally formed or molded as a single piece. In another embodiment, the housing 14 and handle 16 are formed separately and attached to each other by way of a mechanical fastener or the like. In an embodiment, the handle 16 is configured to be fixedly positioned relative to the housing 14. In another embodiment, the handle 16 is movable relative to the housing 14 to allow the operator to ergonomically position the handle 16 relative to the housing 14 to maximize comfort while carrying the blower/vacuum 10. The user-controlled trigger 18 is operatively connected to the handle 16 and controls the speed of the blower/vacuum 10.

The starter assembly 20 is operatively connected to the side of the housing 16, as shown in FIG. 1. It should be understood by one having ordinary skill in the art that the starter assembly 20 can extend from either side of the housing or the rear of the housing, depending upon the orientation and type of the power source 22. In the illustrated exemplary embodiment, the starter assembly 20 is a pull-start having a handle attached to a wound rope (not shown). It should be understood by one having ordinary skill in the art that the starter assembly 20 can be formed as a different mechanical operable system for starting the power source (such as a crank, or the like) or an electrical system capable of starting the power source (such as a push-button starter, or the like).

The housing 14 is configured to protect the power source 22 (FIG. 5), or other power source, located therewithin. The housing 14 can be formed of a plurality of pieces, which allows the power source 22 to be operatively connected to the housing 14 and be disposed therein when the housing 14 is assembled.

In an embodiment, the shield 24 extends forwardly from the housing 14, wherein the shield 24 is configured to protect the drive shaft 26 (FIG. 5) that extends from the power source 22 to the fan member 28, as shown in FIGS. 1-3. The shield 24 can be formed separately from the housing 14 and attached thereto, or the shield 24 can be integrally formed with a portion of the housing 14. In an embodiment, the shield 24 is a single member. In another embodiment, the shield 24 is formed of multiple pieces. At least a portion of the shield 24 is positioned within the attachment shell 30.

In an embodiment, the attachment shell 30 of the base 12 is formed as a generally conical shape that extends from the housing 14 and surrounds at least a portion of the shield 24, as shown in FIGS. 1-3. The attachment shell 30 is configured to provide a structure to which the blower assembly 32 and the vacuum assembly 34 are removably and selectively attachable. In an embodiment, the attachment shell 30 is formed of a clear, or otherwise transparent material. For example, the attachment shell 30 is formed of clear polycarbonate, plastic, or any other materials providing sufficient strength and rigidity to withstand the pressure increases and decreases within the attachment shell 30 as well as withstand repeated contact with debris that is suctioned when in the vacuum configuration 10b while also being transparent to allow an operator the ability to view into the attachment shell 30 to determine if there is a blockage or any other problem. It should be understood by one having ordinary skill in the art that the attachment shell 30 may also be formed of a non-clear or a non-transparent material. The attachment shell 30 surrounds at least a portion of the fan member 28.

In the exemplary embodiment shown in FIGS. 1-3 and 5-6, the mixed-flow fan member 28 is operatively connected to the base 12 and is powered by the power source 22 by way of a drive shaft 26. The drive shaft 26 is configured to rotate in the same direction during both the blower configuration as well as the vacuum configuration, and the fan member 28 is configured to provide positive-pressure air flow when the blower assembly 32 is attached to the attachment shell 30 and a reduced-pressure air flow when the vacuum assembly 34 is attached to the attachment shell 30.

Figure 6:
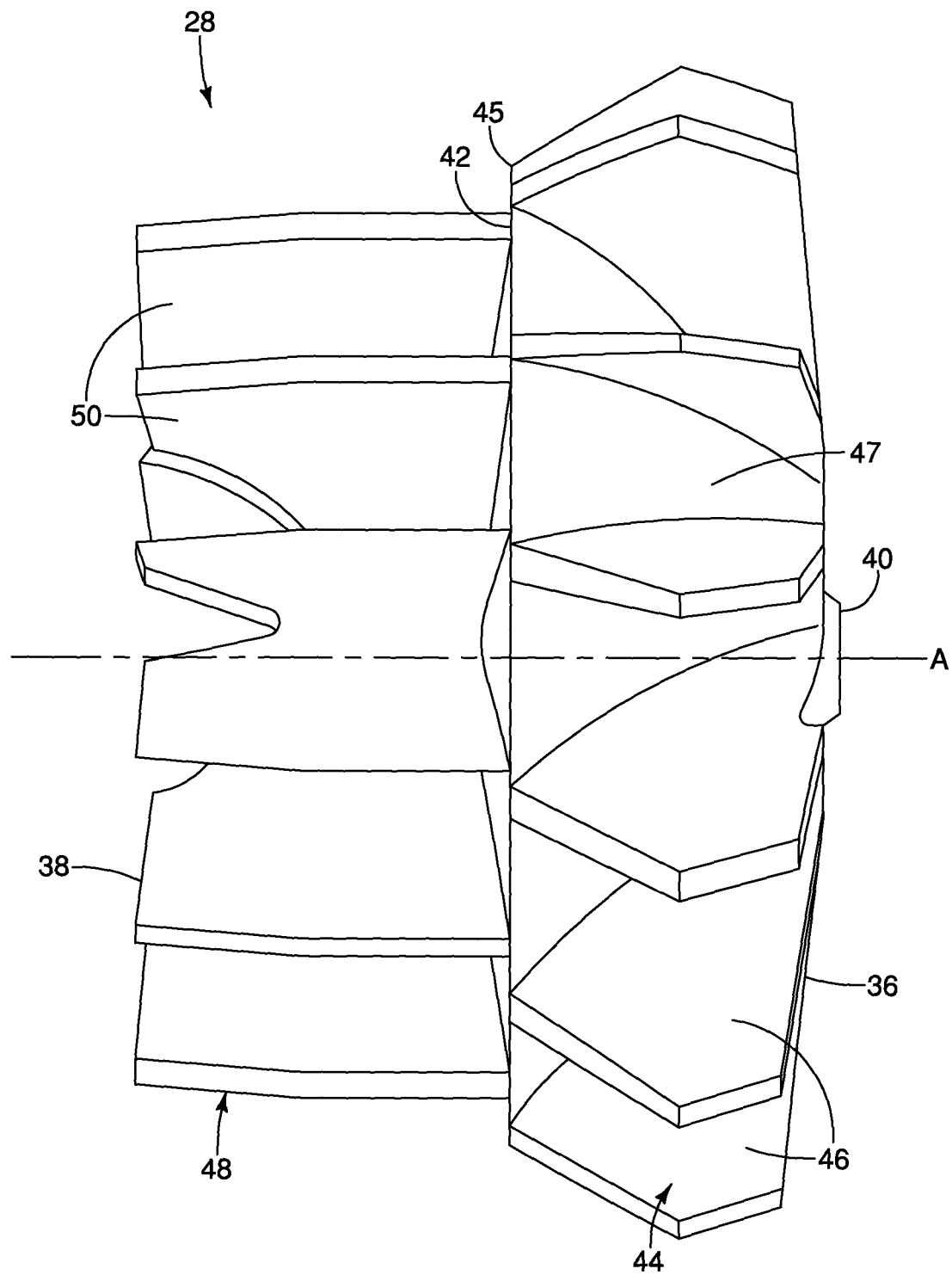
FIG. 6 is an embodiment of a fan member.

In the illustrated exemplary embodiment, the mixed-flow fan member 28 is formed as a one-piece member, as shown in FIG. 6, of molded plastic but can be formed of any material. In an embodiment, the fan member 28 includes a rear end 36, a forward end 38, central hub 40, a plate 42 extending radially from the central hub 40, a first fan 44 having a plurality of first fan blades 46 extending radially from the central hub 40, and a second fan 48 having a plurality of second fan blades 50 extending radially from the central hub 40. In another embodiment, the fan member 28 is includes a first fan 44 formed separately from the second fan 48, wherein the first and second fans 44, 48 are attached to each other to form the fan member 28. In some embodiments, the fan member 28 does not include the plate 42 separating the first and second fans 44, 48. When assembled, the rear end 36 of the fan member 28 is directed toward the power source 22 and the longitudinal direction of the fan member 28 is aligned with the drive shaft 26. The hub 40 is a cylindrical member aligned axially with the drive shaft 26, wherein the drive shaft 26 is received within the hub 40 to allow the fan member 28 to be releasably attached or otherwise connected to the drive shaft 26. The drive shaft 26 is configured to drive, or rotate, the fan member 28 about the axis formed by the draft shaft 26. The fan member 28 is formed as a single component in which each of the portions of the fan member 28 are integrally formed together. In an embodiment, the fan member 28 is formed of molded plastic or other resilient material that may include aluminum, titanium, high density polyethylene (HDPE), or any other resilient material.

Fans used for generating air flow are typically formed as an axial fan or a centrifugal fan. Axial fans are configured to have a plurality of fan blades extending substantially radially from a hub, wherein the radial fan blades generate air flow that is aligned, or parallel to the drive shaft to which the fan is attached. In other words, the axial fan pushes the air along from upstream to downstream along a linear-like pathway. The fan blades of the axial fan are typically arranged in a cantilever arrangement such that the base of the blade is attached to a hub and the tips of the blade are unconstrained. Axial fans are often used in wind turbines, box/home fans, fume extraction, winnowing, and the like. Centrifugal fans are configured to have a plurality of fan blades attached to the outer circumferential surface of a central hub, wherein the fan blades extend radially outward from the hub. Upstream air is drawn toward the central hub of the centrifugal fan, wherein the fan blades are aligned and oriented to push the air radially outward in a centrifugal manner. The blades of the centrifugal fan are typically positioned against a plate (or between a pair of parallel plates) that likewise extends from the central hub, wherein the plate prevents axial movement of the air flow, thereby generally confining the air flow to radial flow. Centrifugal fans are often used in handheld lawn care blowers, HVAC systems, and the like where the desired air flow is radially outward from the fan. The fan member 28 used in the blower/vacuum incorporates aspects of both axial and centrifugal fans to provide a mixed-flow fan, wherein the generated air flow is both radial and axial.

As shown in the exemplary embodiment of the fan member 28 in FIG. 6, the plate 42 is formed as a substantially circular and planar member that extends radially from the outer circumference of the central hub 40, wherein the plate 42 is positioned about midway between the rear end 36 and the forward end 38 of the fan member 28. The plate 42 is configured to separate the first fan 44 from the second fan 48, thereby providing two distinct operations of the fan member 28—one for blowing and the other for vacuuming, as will be explained below. In an embodiment, the first and second fan blades 46, 50 have substantially the same width relative to the longitudinal axis of the fan member 28 between the rear and forward ends 36, 38 thereof. In other embodiments, the plate 42 is positioned longitudinally closer to either the rear end 36 or the forward end 38 of the fan member 28, thereby allowing either the first or second fan blades 46, 50 to have a larger width than the other set of fan blades.

In the exemplary embodiment of the fan member 28 shown in FIG. 6, the first fan 44 is configured as an axial fan in which the first fan blades 46 are operatively connected to the central hub 40, extending radially outward beyond the circumferential outer edge 45 of the plate 42 in a cantilevered manner. In the illustrated exemplary embodiment, the first fan blades 46 are angled or curved relative to the central hub 40. The first fan blades 46 are both angled along the circumference of the hub 40 but also curved between the base (intersecting with the hub 40) and the tip (radially outward edge) of each blade. In this embodiment, the base of each of the first fan blades 46 is angled such that the base is radially closer to the drive shaft 26 near the rear end 36 and radially further away from the drive shaft 26 near the plate 42. The outer circumferential edge 45 of the first fan blades 46 is also formed at an angle between the plate 42 and the rear end 36. In a further embodiment, the base of each of the first fan blades 46 is aligned with the longitudinal axis A, and the first fan blades 46 extend in a substantially planar manner between the base and tip of each blade. It should be understood by one having ordinary skill in the art that the first fan blades 46 can be planar, curved, a combination thereof, or have any shape sufficient to provide increased air flow resulting from the rotation of the fan member 28, wherein the air flow generated by the first fan blades is substantially parallel to the drive shaft 26 (FG. 5). In an embodiment, the first fan blades 46 extend from a frusto-conical surface 47 operatively connected to the central hub 40, wherein the radial distance between the frustoconical surface 47 and the central hub 40 increases as it extends away from the rear end 36 toward the plate 42.

In the exemplary embodiment of the fan member 28 illustrated in FIG. 6, the second fan 48 is formed as a centrifugal fan. The second fan 48 is formed of a plurality of second fan blades 50 that are positioned between the plate 42 and the forward end 38. The second fan blades 50 extend from the central hub 40 in a substantially planar manner, wherein the blade tip of each of the second fan blades 50 is aligned with the longitudinal axis A and substantially aligned with the outer circumference of the plate 42, but it should be understood by one having ordinary skill in the art that tips of the second fan blades 50 may extend beyond the outer circumferential edge of the plate 42. In another embodiment, the second fan blades 50 are curved, similar to the curved first fan blades 46 described above. In the illustrated embodiment, the first fan blades 46 extend radially outward a greater distance than the second fan blades 50.

The first fan 44 and the second fan 48 of the fan member 28 are configured to perform separate operations, depending upon the configuration of the blower/vacuum 10 and the mode of the fan member 28. For example, when the blower assembly 32 is attached to the base 12, the blower/vacuum 10 is in the blower configuration 10a (FIG. 1). In the blower configuration 10a, the fan member 28 is in the blower mode in which the first fan 44 is active and the second fan 46 is inactive but continues to rotate in conjunction with the first fan 44. Accordingly, in the blower mode and configuration 10a, the first fan 44 is configured to provide positive-pressure air flow to cause air to be blown axially through the blower assembly 32.

When the vacuum assembly 34 is attached to the base 12, the blower/vacuum 10 is in the vacuum configuration 10b (FIG. 2). In the vacuum configuration 10b, the fan member 28 is in the vacuum mode in which the second fan 46 is active and the first fan 44 is inactive but continues to rotate in conjunction with the second fan 46. Accordingly, in the vacuum mode and configuration 10b, the second fan 48 is configured to provide negative-pressure air flow to cause air to be drawn toward the base 12 into and through the vacuum assembly 34 due to the centrifugal air flow from the second fan 46. In both the blower and vacuum modes and configurations 10a, 10b, the fan member 28 is configured to blow air through an outlet port. In the blower configuration 10a, the air flow from the fan member 28 exits through the blower tube 62 which acts as the outlet port, as explained below; in the vacuum configuration 10b, the air flow from the fan member 28 exits through the outlet 102 of the fan housing 104 which acts as the outlet port, as explained below. The switchability between the blower and vacuum configurations 10a, 10b, as illustrated in FIG. 4, causes each of the first and second fans 44, 48 to be utilized separately for different configurations of the blower/vacuum 10.

Figure 7:
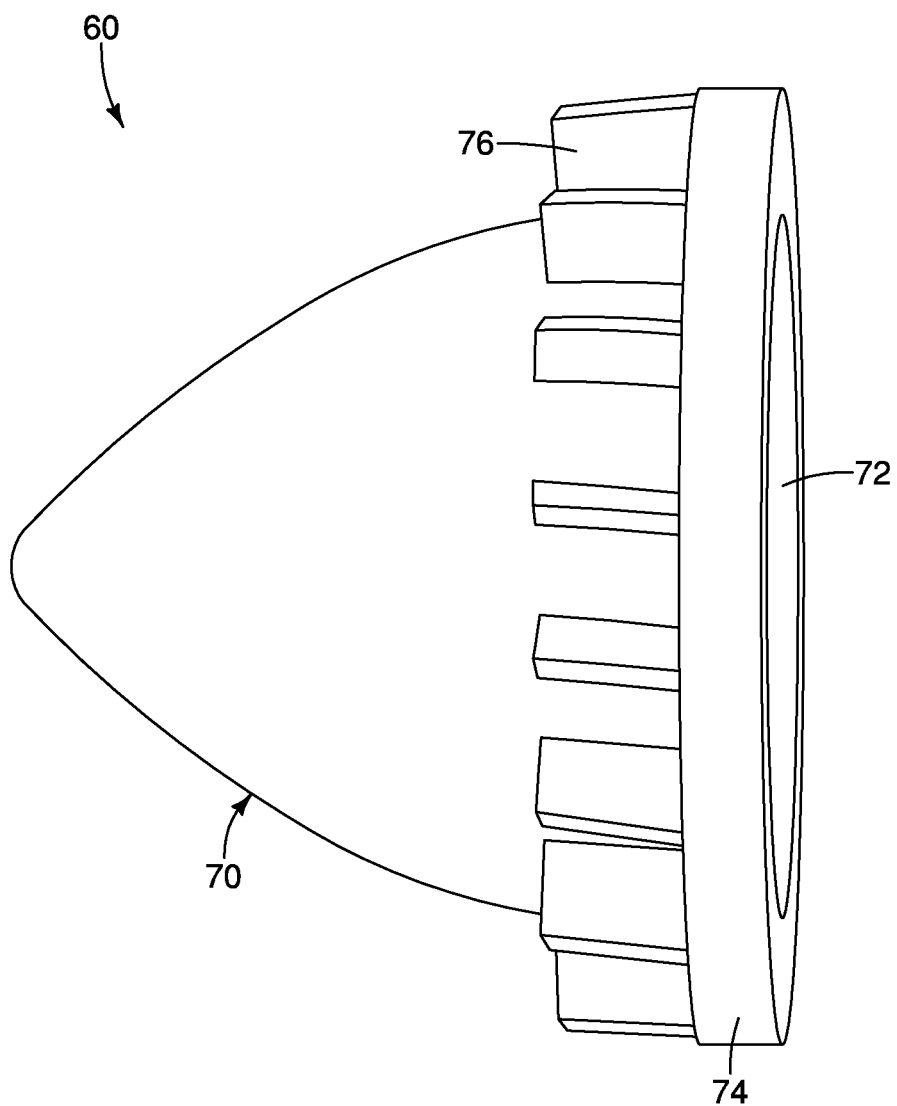
FIG. 7 is an embodiment of a diffuser.

As shown in FIG. 3, an embodiment of the blower assembly 32 includes a diffuser 60, a blower housing 62, a blower tube 64, and an optional extension tube 66. The blower assembly 32 is releasably attachable to the base 12 to generate the blower configuration 10a (FIG. 1). In an embodiment, the diffuser 60 includes an elongated cone 70 having an open end 72, a platform 74 surrounding and extending radially outward from the open end 72, and a plurality of vanes 76 extending from the platform 74 adjacent to the outer circumferential surface of the cone 70, as illustrated in FIG. 7. The cone 70 is an elongated, substantially hollow member, wherein the open end 72 is positioned upstream, or otherwise directed toward the base 12. The tip of the cone 70 extends away from the open end 72 and the base 12, wherein the diameter of the cone 70 narrows as the cone 70 extends away from the open end 72. The open end 72 forms a substantially circular opening to the inside of the cone 70. The open end 72 is configured to receive and completely surround the second fan 48 of the fan member 28.

The platform 74 is formed of an annular ring and a plurality of ribs, wherein the annular ring is operatively connected to the outer surface of the cone 70 by way of the plurality of ribs. The ribs form open pathways between the annular ring and the cone 70 to allow air to flow from the fan member 28 and past the diffuser 60 between the annular ring of the platform 74 and the cone 70, as shown in FIG. 7. The air flow through the platform 74 between the annular ring and the cone 70 is generated by the first fan 44 of the fan member 28. In an embodiment, the vanes 76 are extensions of the ribs of the platform 74 such that the vanes 76 and the ribs are aligned to provide a continuous wall or barrier for directing the air flow over the outer surface of the cone 70. In another embodiment, the vanes 76 are spaced apart from the ribs of the platform 74 in order to form separate barriers for directing the air flow over the outer surface of the cone 70 separate from the ribs that provide pathways through which air can pass through the platform 74. The vanes 76 can be formed as planar members or curved members for directing the flow of air past the outer surface of the cone 70, but it should be understood by one having ordinary skill in the art that the overall shape, configuration, and placement of the vanes 76 is optimized to maximize performance of the blower/vacuum 10 when in the blower configuration 10a.

Figure 4:
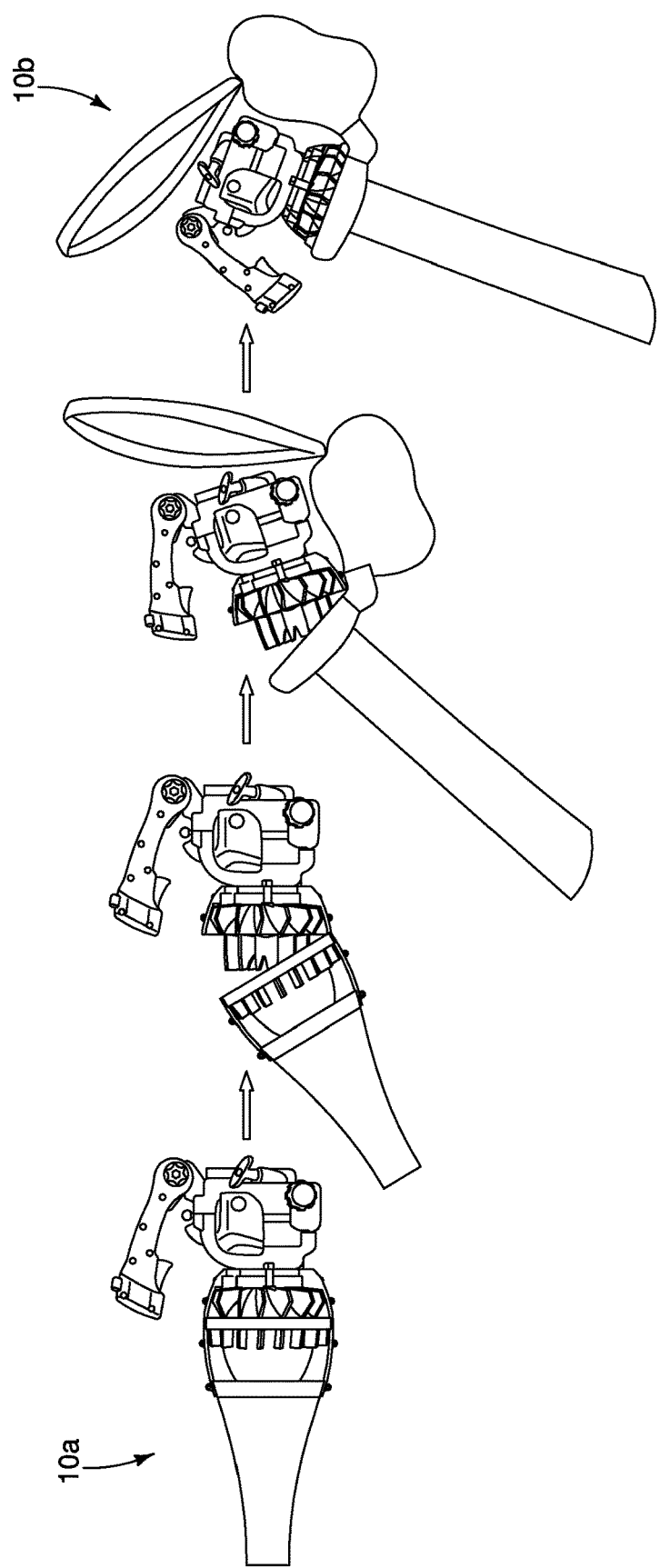
FIG. 4 is a schematic illustrating the steps for switching between a blower configuration and a vacuum configuration.
Figure 5:
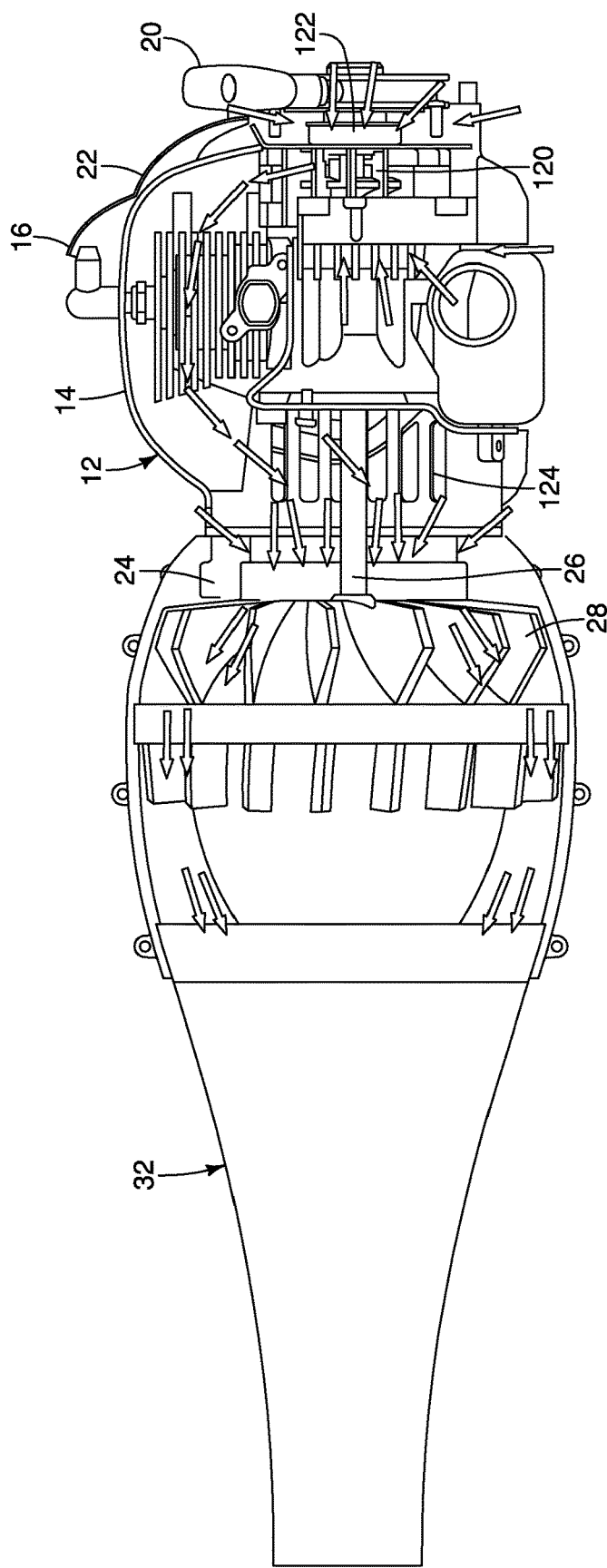
FIG. 5 is a partial cross-sectional view of the base of a blower/vacuum.

In an embodiment, the blower housing 62 of the blower assembly 32 is attachable to the attachment shell 30 of the base 12 to operatively connect the blower assembly 32 to the base 12, as shown in FIGS. 3-5. The blower housing 62 is a clear, or otherwise substantially transparent, member configured to receive and surround the diffuser 60. The blower housing 62 provides a flow path with a narrowing diameter to aide in increasing the velocity of the air as it flows over the diffuser 60. The blower housing 62 includes a ridge 80 formed on the inner surface thereof, wherein the diffuser 60 is configured to abut the ridge 80 when the blower housing 62 is attached to the attachment shell 30. The ridge 80 provides positive positioning of the diffuser 60 relative to the fan member 28 when the blower assembly 32 is attached to the base 12.

The blower housing 62 is attachable to the attachment shell 30 by way of at least one attachment mechanism 82. FIG. 3 illustrates an exemplary embodiment of a mechanical attachment mechanism 82, which includes an anchor 84 integrally formed with both the blower housing 62 and the attachment shell 30. The anchor 84 is formed generally as a hook that extends away from the opposing member to which it is being attached. The attachment mechanism 82 also includes a toggle 86, which is secured to one of the anchors 84 and is configured to releasably engage the anchor 84 on the opposing member. For example, in an embodiment, the toggle 86 is secured to the anchor 84 of the blower housing 62 by way of a pin that provides an axis of rotation for the toggle 86, and the toggle 86 is configured to releasably engage the anchor 84 on the attachment shell 30. In another embodiment, the toggle 86 is secured to the anchor 84 of the attachment shell 30 with the pin and is configured to releasably engage the anchor 84 of the blower housing 62.

Because only one anchor-toggle-anchor attachment mechanism 82 would be insufficient to completely secure the blower housing 62 to the attachment shell 32, one embodiment of the attachment shell 32 and blower housing 62 may include two, three, or more anchor-toggle-anchor attachment mechanisms 82 positioned about the periphery to attach these members together. In another embodiment, an anchor-toggle-anchor attachment mechanism 82 may be used in conjunction with a hook-and-loop attachment mechanism 82, wherein the hook-and-loop (not shown) includes a loop extending from the attachment shell 32 and a hook extending from the blower housing 62 such that the hook is received in the loop to form a hinge or rotatable connection between the blower housing 62 and the attachment shell 32 which allows the blower housing 62 to be positively secured and rotatable with the hook-and-loop attachment mechanism while the anchor-toggle-anchor attachment mechanism is secured at the opposite edge between the members.

In a further embodiment, another attachment mechanism 82 for securing the blower housing 62 to the attachment shell 30 is a threaded engagement (not shown) in which both the blower housing 62 and the attachment shell 30 include threads which are configured to mesh with the threads of the opposing member which allow the blower housing 62 to be twisted relative to the attachment shell 30 such that the threads mesh and provide a positive releasable engagement therebetween. In yet another embodiment, the attachment mechanism(s) 82 between the blower housing 62 and the attachment shell 30 include a plurality of bolts (not shown) that allow the blower housing 62 to be releasably attachable to the attachment shell 30. While these exemplary embodiments of attachment mechanisms 82 are mechanical, the attachment mechanisms 82 can also be formed as magnets that provide releasable engagement between the blower housing 62 and the attachment shell 30. It should be understood by one having ordinary skill in the art that any attachment mechanism 82, or a plurality of the same or different attachment mechanisms, can be used to provide for releasable attachment between the blower housing 62 and the attachment shell 30.

In an embodiment, the blower tube 64 of the blower assembly 32 is releasably attachable to the end of the blower housing 62 opposite the end attachable to the attachment shell 30, as shown in FIGS. 1, 3, and 4-5. The blower tube 64 is an elongated tube having an inlet and an outlet, wherein the diameter of the inlet is larger than the diameter of the outlet. This reduced diameter acts to increase the velocity of the air flow through the blower tube 64. In an embodiment, the blower tube 64 is releasably securable to the blower housing 62 by way of at least one attachment mechanism (not shown), such as a keyed locking mechanism or the like. In another embodiment, the blower tube 64 is releasably securable to the blower housing 62 by way of a friction fit.

In the embodiment illustrated in FIG. 3, the blower assembly 32 includes an extension tube 66 that is attachable to the blower tube 64. The extension tube 66 is configured to extend the length of the blower tube 64 to allow the operator to remain standing upright yet position the end of the blower assembly 32 as close to the ground or surface being blown without the need to bend over to achieve such positioning. The length of the extension tube 66 can vary depending upon the height of the operator or the operation in which the blower configuration 10*a* is being used.

When the blower/vacuum 10 is in the blower configuration 10*a*, the blower assembly 32 is attached to the base 12 by way of at least one attachment mechanism 82, as shown in FIGS. 1, 3, and 5. As the blower housing 62 is secured to the attachment shell 30, the diffuser 60 is abutting the ridge 80 formed on the inner surface of the blower housing 62, and the diffuser 60 is positively positioned relative to the fan member 28 such that the second fan 48 is inserted through the open end 72 and located within the cone 70 of the diffuser 60. In this position, the platform 74 is either abutting the plate 42 of the fan member 28 that separates the first and second fans 44, 48 or is positioned immediately adjacent to the plate 42. In an embodiment, the diffuser 60 contacts the plate 42 of the fan member 28. In another embodiment, the diffuser 60 is spaced very slightly apart from the plate of the fan member 28. The positioning of the diffuser relative to the fan member 28, wherein the second fan 48 is located within the cone 70 of the diffuser 70, leaves only the first fan blades 46 exposed to generate a positive-pressure air flow directed over the diffuser 60 while simultaneously deactivating the effect of the second fan 48 as any air movement generated by the second fan 48 is contained within the cone 70 of the diffuser 60. The diffuser 60 effectively "hides" the second fan blades 50 to allow only the first fan blades 46 to be active in the blower configuration 10*a*, but the second fan 48 continues to rotate simultaneously with the first fan 44.

In operation, the throttle 18 of the base 12 controls the output rotational speed from the power source 22 that rotates the drive shaft 26 which, in turn, rotates the fan member 28. As the first fan blades 46 of the fan member 28 are exposed in the blower configuration 10*a*, rotation of the first fan 44 generates a positive-pressure air flow directed over the diffuser 69, through the blower housing 62, blower tube 64, and then through the optional extension tube 66, if present. As the rotational output of the power source 22 is increased in response to the throttle 18, the velocity of the air flow through the blower assembly 32 increases, and vice-versa with respect to the velocity of the air flow.

In the illustration of FIG. 4, the blower assembly 32 is removable from the base 12 and replaceable with the vacuum assembly 34, and vice-versa, to switch the blower/vacuum 10 from the blower configuration 10*a* (FIG. 1) to the vacuum configuration (FIG. 2). Similar to the blower assembly 32 is releasably attachable to the attachment shell 30 of the base 12 using at least one attachment mechanism 82 for positively securing the vacuum assembly 34. In an exemplary embodiment of a vacuum assembly 34 illustrated in FIGS. 2-3 and 8, the vacuum assembly 34 includes a first vacuum shell 90 and a second vacuum shell 92 which together form a vacuum housing 98, a vacuum tube 94, and an optional collection bag 96.

Figure 8:
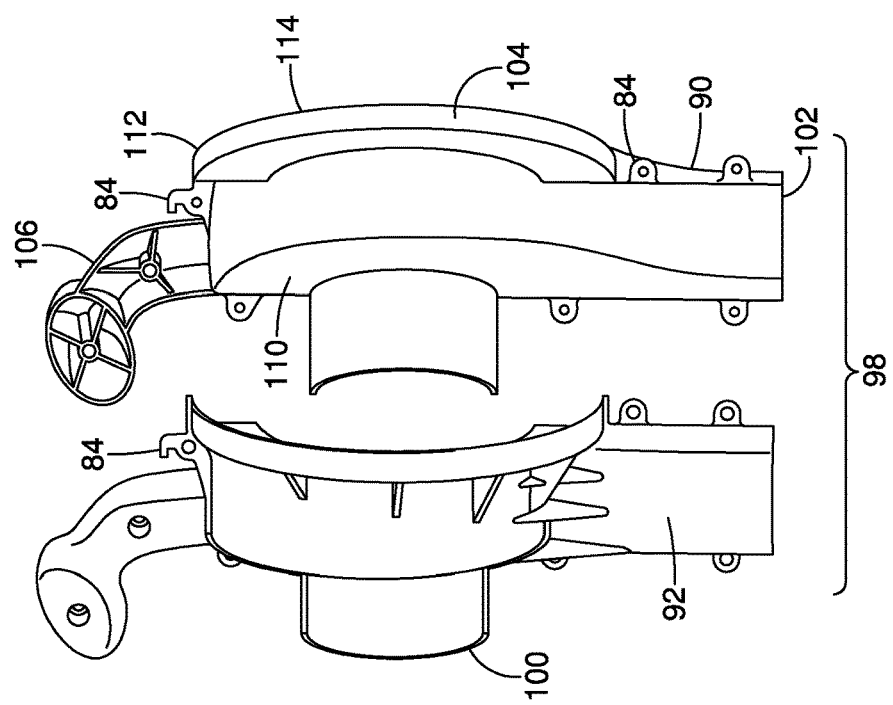
FIG. 8 is an embodiment of a vacuum assembly.
Figure 8:
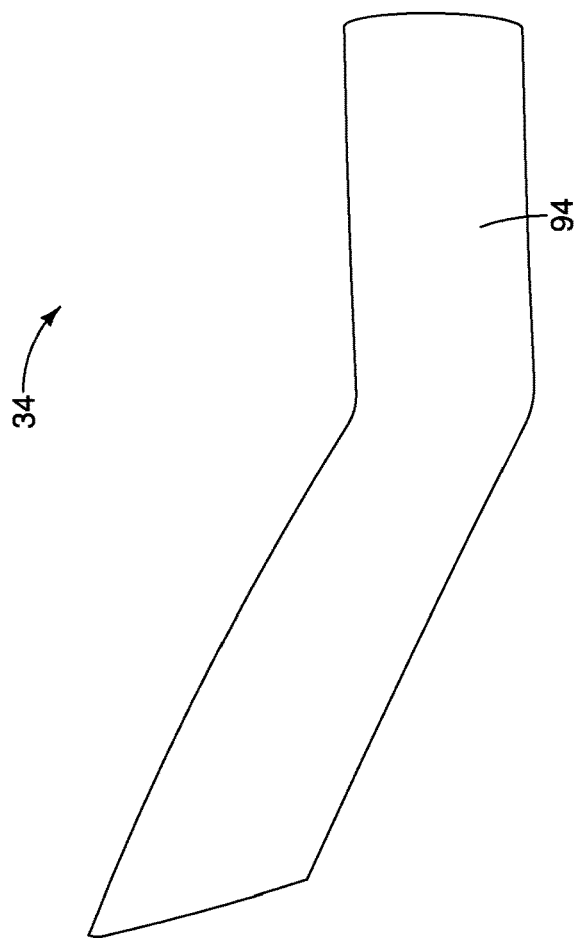

The first and second vacuum shells 90, 92 of the vacuum assembly 34 are formed as substantially mirror images of each other and are attachable together to form a vacuum housing 98, as shown in FIGS. 2-3 and 8. The vacuum housing 98 includes an inlet 100, an outlet 102, a fan housing 104, and an optional handle 106. In an embodiment, the first and second vacuum shells 90, 92 include a plurality of bosses to allow the opposing shells to be connected together with nuts and bolt. In another embodiment, the first and second vacuum shells 90, 92 can be connected together using any attachment mechanism that allows the shells to be releasably attachable. In the illustrated embodiment, the vacuum housing 98 is formed of separate pieces. In another embodiment, the vacuum housing 98 is formed as a single integral member.

The fan housing 104 of the vacuum housing 98 is fluidly connected to both the inlet 100 and the outlet 102, thereby providing a continuous pathway between the inlet 100 and outlet 102 and through the fan housing 104, as shown in FIGS. 2-3 and 8. The fan housing 104 has a toroid-like shape without the inner diameter surface, thus providing a vertically-aligned forward wall 110, a rear wall 112 oriented parallel relative to the forward wall 110, and an annular wall 114 extending between the forward wall 110 and the rear wall 112. The forward wall 110 includes an opening from which the inlet 100 extends in a forward direction. The rear wall 112 likewise includes a circular opening. The outlet 102 extends in a downward direction from the annular wall 114, in a substantially perpendicular manner relative to the inlet 100, from the fan housing 104. The toroidal fan housing 104 is configured to receive a portion of the fan member 28 through the opening in the rear wall 112 when the vacuum housing 98 is operatively connected to the base 12.

The vacuum housing 98 is attachable to the base 12 in a similar manner as the blower housing 62, in particular, by way of at least one attachment mechanism 82, described above. The same attachment mechanism 82 should be used to attach the vacuum housing 98 to the base 12 as used to attach the blower housing 62 to the base 12. For example, the illustrated exemplary embodiment utilizes at plurality of anchor-toggle-anchor attachment mechanisms to attach the vacuum assembly 24 to the attachment shell 30 of the base 12, but it should be understood by one having ordinary skill in the art that any other attachment mechanism(s) can be used.

The vacuum tube 94 of the vacuum assembly 34 is attachable to the vacuum housing 98 to provide an extension for the suction inlet 100 to be located closer to the ground or other structure so as to reduce or eliminate the need for the operator to continually bend over in order to use the vacuum/blower 10 in the vacuum configuration 10*b*. The vacuum tube 94 is an elongated tubular member which can be formed as a straight tube (FIG. 2) or a tube having at angled portion (FIG. 3). The vacuum tube 94 is configured to be attached to the inlet 100 that extends forwardly from the fan housing 104. In an embodiment, the vacuum tube 94 is attached to the inlet 100 by friction fit in which the inner diameter of the vacuum tube 94 is the same or just slight larger diameter than the outer diameter of the inlet 100 such that the vacuum tube 94 is slid over the inlet 100 for installation. In another embodiment, the vacuum tube 94 is attached to the inlet 100 by way of at least one attachment mechanism, which can be either the same type or a different type than used to attach the vacuum housing 98 to the base 12.

The vacuum housing 98 includes an optional handle 106 (included—FIG. 8; not included—FIG. 2), wherein the handle 106 extends upwardly from the fan housing 104. The handle 106 allows the user to use both hands to grasp the blower/vacuum 10, wherein one hand can grasp the handle 16 of the base and the other hand can grasp the handle 106 of the vacuum housing 98. When the vacuum housing 98 includes a handle 106, the entire handle 106 can be integrally formed with one of the first or second vacuum shells 90, 92, or half of the handle 106 can be integrally formed with a respective vacuum shell 90, 92 such that when the first and second vacuum shells 90, 92 are attached to each other, the handle halves form a complete handle 106.

The vacuum assembly 34 further includes an optional collection bag 96, which is attachable to the outlet 102 of the vacuum housing 98, as shown in FIGS. 2 and 4. The collection bag 96 includes a port that is configured to engage the outlet 102 by a friction fit. The collection bag 96 includes a strap that can be positioned over the shoulder of the operator, which allows the weight of the debris in the collection bag 96 to be carried by the operator's body as opposed to having the entire weight added to the blower/vacuum 10 being carried.

In the illustrated embodiment, assembly of the blower/vacuum 10 in the vacuum configuration 10b includes attaching the first and second vacuum shells 90, 92 together to form the vacuum housing 98. The vacuum housing 98 is then attached to the attachment shell 30 of the base 12 using a plurality of attachment mechanisms 82 which connect opposing anchors 84 located on both the attachment shell 30 and the vacuum housing 98. As the vacuum housing 98 is positioned against the attachment shell 30, the fan assembly 28 is inserted into the opening in the rear wall 112 of the fan housing 104 such that the second fan 48 is positioned within the fan housing 104 and the rear wall 112 is abutting or positioned immediately adjacent to the plate 42 of the fan member 28. Because the rear wall 112 of the fan housing 104 either slightly contacts or is positioned immediately adjacent to the plate 42 of the fan member 28 such that the second fan 48 is located within the fan housing 104, the first fan 44 is effectively deactivated as air flow caused by rotation of the first fan blades 46 is blocked by the rear wall 112 of the fan housing 104. As such, only the second fan blades 50 of the second fan 48 are active in the vacuum configuration 10b. The vacuum tube 94 and collection bag 96 can then be attached to the vacuum housing 98.

In operation, the throttle 18 of the base 12 controls the output rotational speed from the power source 22 that rotates the drive shaft 26 which, in turn, rotates the fan member 28. As the second fan blades 50 of the fan member 28 are active within the fan housing 104 in the vacuum configuration 10b, rotation of the second fan 48 generates a negative-pressure air flow which creates a suction with draws air into the fan housing 104 through the inlet 100 (via the vacuum tube 94). The air flow and any debris that is drawn into the fan housing 104 are then ejected out through the outlet 102 via centrifugal air flow generated by the second fan 48 of the fan member 28. While the debris is within the fan housing 104, the rotation of the second fan 48 acts to crush, pulverize, or otherwise break up at least some of the debris into smaller particles. As the rotational output of the power source 22 is increased in response to the throttle 18, the velocity of the air flow through the vacuum assembly 34 increases, and vice-versa with respect to the velocity of the air flow.

The exemplary embodiment of the combined blower/vacuum 10 described above utilizes a single fan member 28 that integrates both a first fan 44 and a second fan 48, wherein each fan is configured to generate either a positive-pressure or negative-pressure air flow. The blower/vacuum 10 is adapted to receive a blower assembly 32 that covers or hides the second fan 48 in a blower configuration 10a to effectively deactivate the second fan 48 which allows the first fan 44 to generate the positive-pressure air flow through the blower assembly 32. The blower/vacuum 10 is also adapted to receive a vacuum assembly 34 that covers or otherwise hides the first fan 44 in a vacuum configuration 10b to effectively deactivate the first fan 44 which allows the second fan 48 to generate the negative-pressure air flow through the vacuum assembly 34. In the blower and vacuum configurations, the fan member 28 generates different types of air flow: axial air flow in the blower configuration and centrifugal air flow in the vacuum configuration. These two separate air flows generated by the same fan member 28 make the fan member 28 a mixed-flow fan, thereby allowing a single fan member 28 to be used in two completely distinct operations in different configurations.

The blower/vacuum 10, when in the blower configuration 10a as shown in FIG. 5, includes a power source 22 that is configured to super-charge the velocity of air flow being expelled from the blower assembly 32. The power source 22 includes a rearwardly-directed flywheel 120 that is positioned adjacent to the starter assembly 20 at the rear of the base 12. As air is drawing into the housing 14 through rear vents 122, the flywheel 120 directs the air over the engine components for cooling and then into the blower intake area. The flywheel 120 includes a combination of fan vanes as well as a pair of oppositely-opposed magnets, wherein the magnets are configured to act in combination with an ignition module that generates a spark for the combustion cylinder. The air from the flywheel 120 that is forced over the power source 22 is mixed and added to the air drawn into the blower intake area through the side vents 124 that are positioned between the power source 22 and the fan member 28. The forced air from the flywheel 120 results in increased air flow velocity produced by the first fan 44 in the blower configuration 10a, thereby generating a super-charged, or increased air flow. It should be understood that the fan member 28 produces enough suction of air from the housing 14 to cool the engine components without the flywheel 120, but the flywheel 120 provides more efficient and more powerful blowing when a flywheel 120 is used. The flywheel 120 positioned at the rear of the base 12 for generating cooling airflow over the engine also improves the performance of the engine as compared to the performance of the engine relying solely upon the fan member 28 creating air flow over the engine or the flywheel positioned at the front of the engine (between the engine and the fan member 28).

Figure 9:
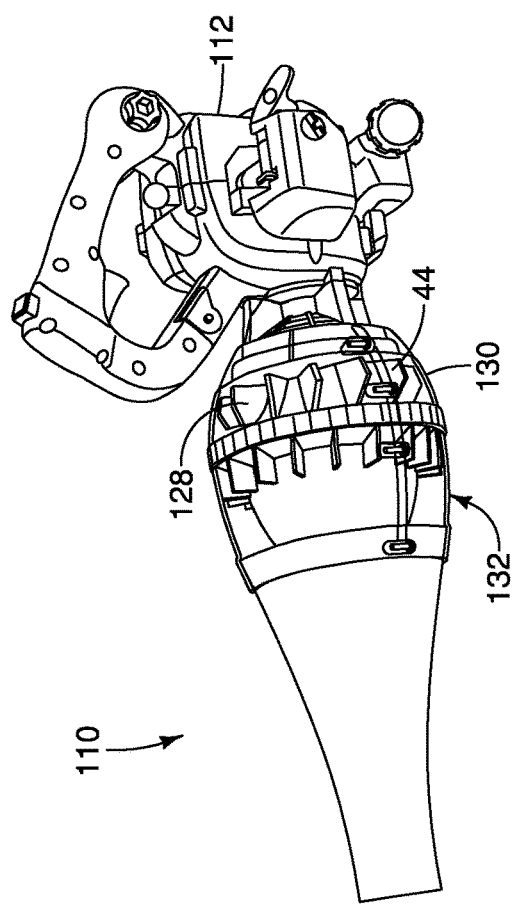
FIG. 9 is an embodiment of a dedicated blower.

In another embodiment, the combined blower and vacuum 10 is either a dedicated blower 110 (FIG. 9) or a dedicated vacuum 210 (FIG. 10), wherein the dedicated blower 110 and dedicated vacuum 210 are not interchangeable between operations or configurations. The dedicated blower 110 includes substantially the same components as the blower/vacuum 10, such as a base 112, a drive shaft (not shown), an attachment shell 130, a fan member 128, and blower assembly 132. The fan member 128 of the dedicated blower 110 includes only the first fan 144 but not the second fan 48 (FIG. 6), because the second fan 48 would never be utilized in the dedicated blower 110. In the illustrated embodiment, the first fan 144 of the dedicated blower 110 is a mixed-flow fan. However, it should be understood by one having ordinary skill in the art that the fan member 128 may also be formed to include both the first fan 144 as well as the second fan 48. The blower assembly 132 of the dedicated blower 110 remains removably attachable to the attachment shell 130 to allow the user to access the fan member 128 and other components for cleaning and general maintenance.

Figure 11A:
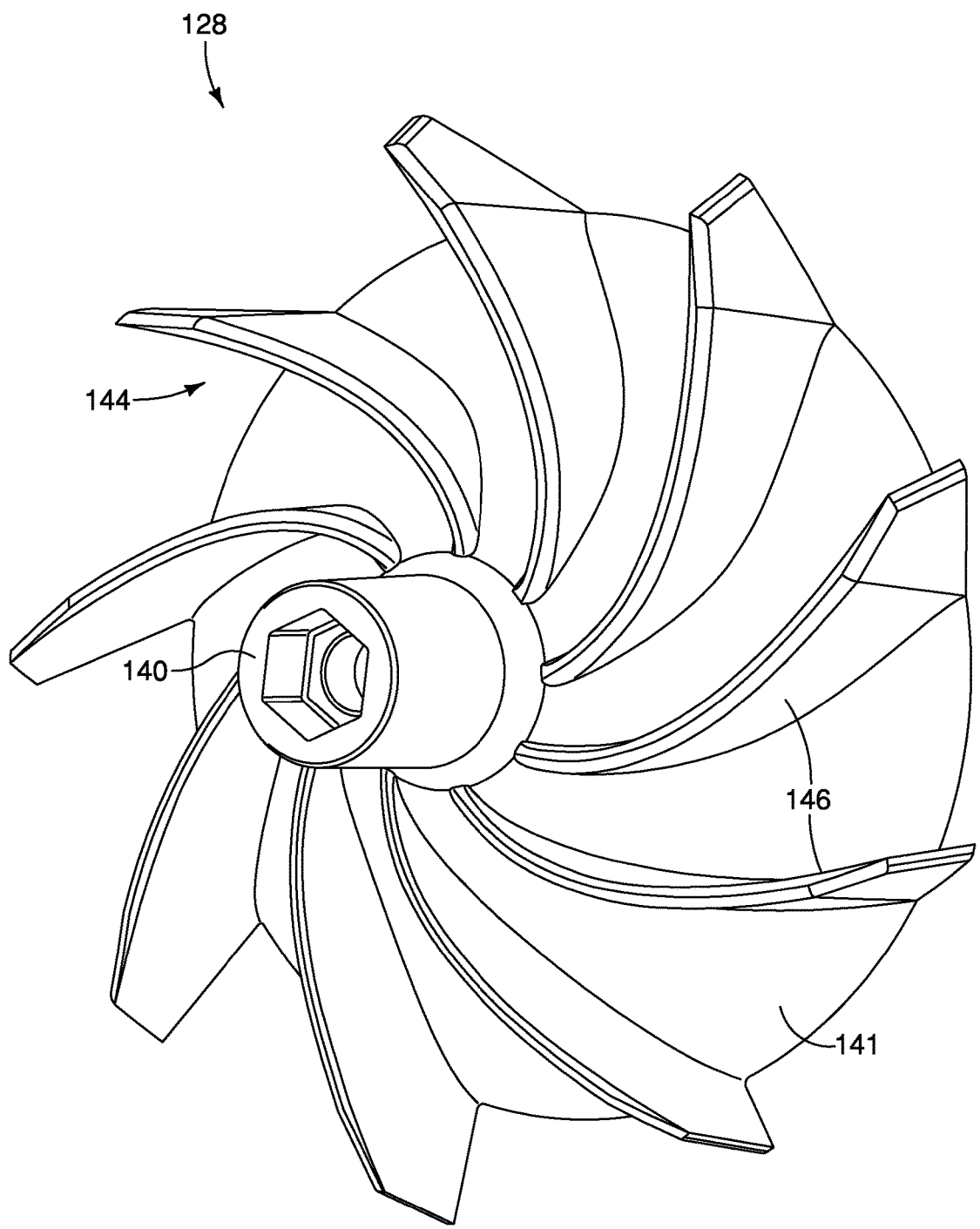
FIG. 11A is a perspective view of an embodiment of a fan member with a first fan.
Figure 11B:
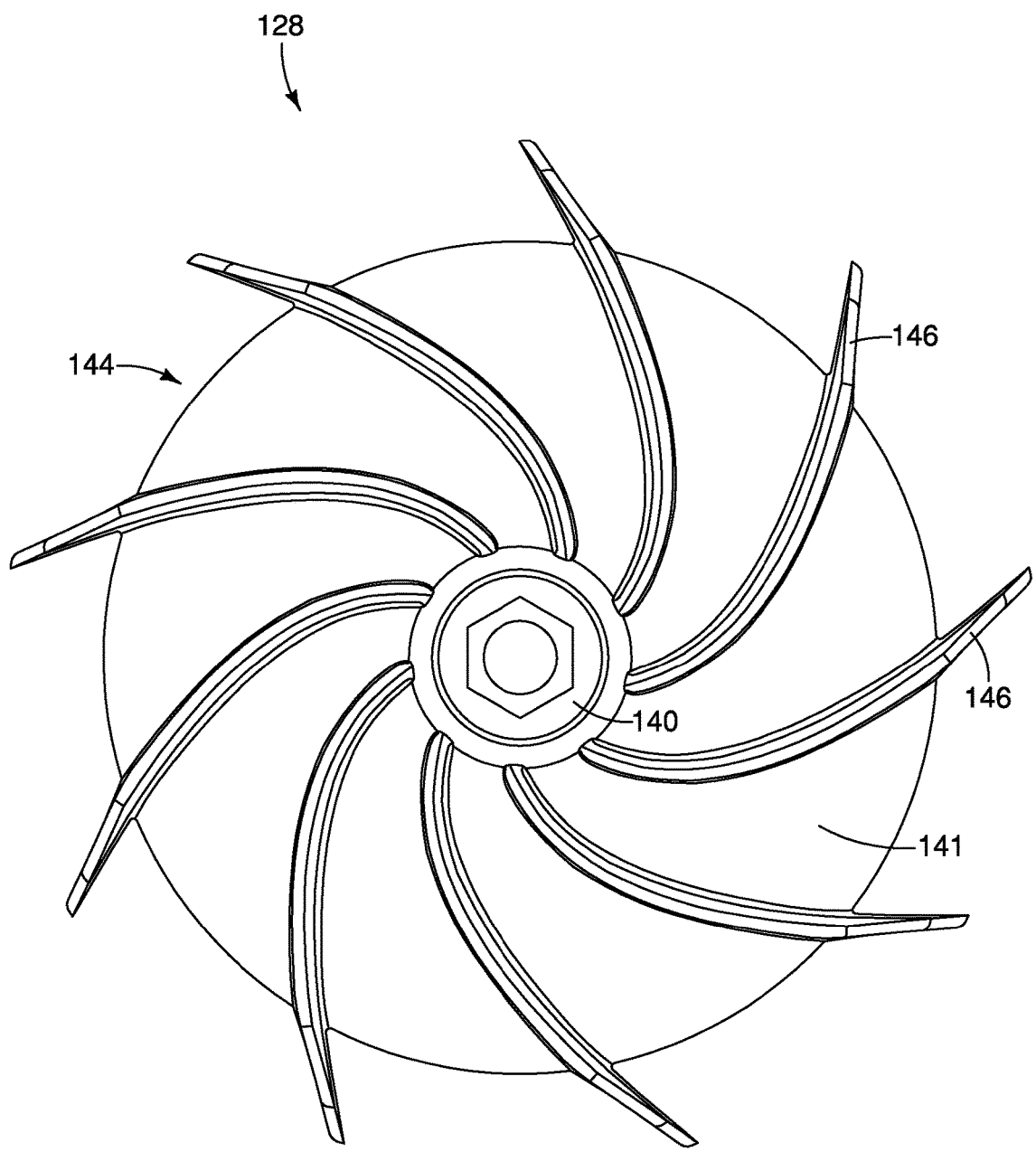
FIG. 11B is a front view of the fan member shown in FIG. 11A.
Figure 11C:
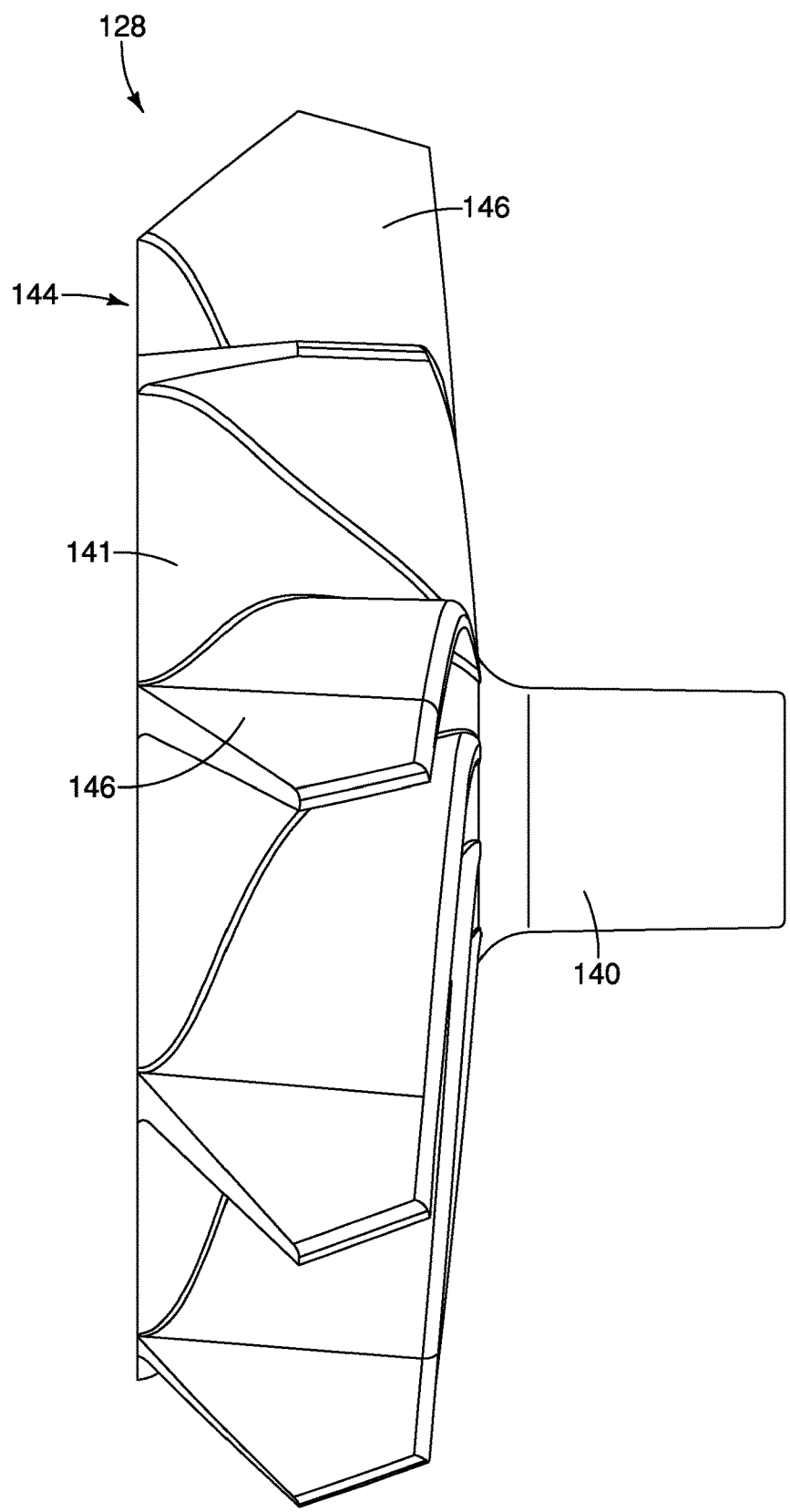
FIG. 11C is a side view of the fan member shown in FIG. 11A.

FIGS. 11A-11C illustrate an embodiment of the fan member 128 for a dedicated blower 110. The illustrated embodiment of the fan member 128 includes only the first fan 144, but it should be understood by one having ordinary skill in the art that a fan member 128 having both the first and second fan 144, 48 can be used. The first fan 144 is configured as a mixed-flow fan in which the first fan blades 146 extend radially outward from the base 140, wherein the first fan blades 146 extend outwardly beyond the circumferential outer edge of the frustoconical surface 141 in a cantilevered manner. In the illustrated exemplary embodiment, the first fan blades 146 are angled or curved relative to the central hub 140. In other words, the first fan blades 146 do not extend radially outward from the central hub 140 in a linear manner. As the first fan blades 146 extend from the central hub 140, the first fan blades 146 continually curve. In one embodiment, the curvature of the first fan blades 146 is in the direction of rotation when the fan member 128 is rotated. In another embodiment, the curvature of the first fan blades 146 is in the opposite direction of rotation when the fan member 128 is rotated. In addition to the curvature of the first fan blades 146 in the radial direction, the first fan blades 146 are also angled with respect to the frustoconical surface 141. It should be understood by one having ordinary skill in the art that the first fan blades 146 can be planar, curved, a combination thereof, or have any shape sufficient to provide increased air flow resulting from the rotation of the fan member 128, wherein the air flow generated by the first fan blades 146 is substantially parallel to the drive shaft 26 (FIG. 5).

Figure 10:
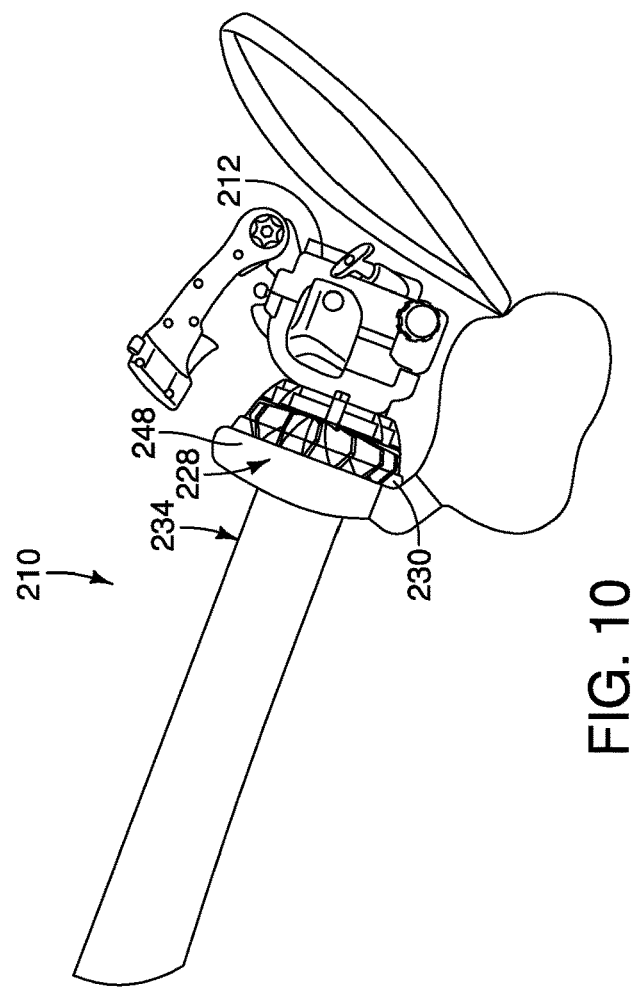
FIG. 10 is an embodiment of a dedicated vacuum.

The dedicated vacuum 210, as shown in FIG. 10, includes substantially the same components as the blower/vacuum 10, such as a base 212, a drive shaft (not shown), an attachment shell 230, and a vacuum assembly 234. The fan member 228 of the dedicated vacuum 210 includes only the second fan 248 but not the first fan 44 (FIG. 6), because the first fan 44 would never be utilized in the dedicated vacuum 210. However, it should be understood by one having ordinary skill in the art that the fan member 228 may also be formed to include both the first fan 44 as well as the second fan 248. The vacuum assembly 234 of the dedicated vacuum 210 remains removably attached to the attachment shell 230 to allow the user to access the fan member 228 and other components for cleaning and general maintenance.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A blower comprising:
   a base having a handle, a housing, and power source positioned within said housing, said power source having a drive shaft extending therefrom, wherein said drive shaft is rotatable by said power source;
   a fan member having a central hub, a frustoconical surface and an outer circumferential edge, the fan member including a first fan having a plurality of first fan blades, wherein said plurality of first fan blades extend outwardly beyond said outer circumferential edge, said fan member being rotatable by said drive shaft;
   a blower assembly selectively attached to said base, wherein said blower assembly includes a blower housing attachable to said base, a diffuser positioned adjacent to said fan member, and a blower tube attachable to said blower housing and extending therefrom;
   wherein said diffuser includes an elongated cone having an open end and a diameter, a platform surrounding and extending radially outward from said open end, and a plurality of vanes extending from said platform.

2. The blower of claim 1, wherein said first fan provides positive-pressure air flow to cause air to be blown axially through said blower assembly.

3. The blower of claim 1, wherein said blower housing is formed of a non-clear or non-transparent material.

4. The blower of claim 1, wherein said blower housing is formed of a clear or transparent material.

5. The blower of claim 4, wherein said blower housing is formed of clear polycarbonate or clear plastic.

6. The blower of claim 1, wherein said attachment of said blower assembly to said attachment shell creates a substantially spherical casing.

7. The blower of claim 6, wherein said spherical casing is transparent.

8. The blower of claim 1, wherein said plurality of first fan blades extend outwardly beyond said circumferential outer edge of said frustoconical surface in a cantilevered manner.

9. The blower of claim 8, wherein said plurality of first fan blades are angled with respect to said frustoconical surface.

10. The blower of claim 1, wherein said plurality of first fan blades are angled or curved relative to said central hub.

11. The blower of claim 1, wherein said plurality of first fan blades generates an air flow that is substantially parallel to said drive shaft.

12. The blower of claim 1, wherein said fan member further includes a second fan.

13. A blower comprising:
    a base having a handle, a housing, and power source positioned within said housing, said power source having a drive shaft extending therefrom, wherein said drive shaft is rotatable by said power source;
    a fan member including a first fan, said fan member being rotatable by said drive shaft;
    a blower assembly selectively attached to said base,
        wherein said blower assembly includes a blower housing attachable to said base, a diffuser positioned adjacent to said fan member, and a blower tube attachable to said blower housing and extending therefrom, and
        wherein said diffuser includes an elongated cone having an edge defining an open end and a diameter, a platform surrounding and extending radially outward from said edge, and a plurality of vanes extending from said platform.

14. The blower of claim 13, wherein said diameter of said elongated cone narrows as it extends away from said open end.

15. The blower of claim 13, wherein said blower housing includes an air flow path with a narrowing diameter for increasing air flow velocity over said diffuser.

16. The blower of claim 13, wherein said fan member further includes a second fan and wherein said open end of said cone receives and completely surrounds said second fan.

\* \* \* \* \*